US012793647B1

(12) United States Patent
Lee et al.

(10) Patent No.: US 12,793,647 B1
(45) Date of Patent: Nov. 10, 2026

(54) DISPLAY DEVICE HAVING COMPENSATION CAPACITORS CONNECTED TO OUTPUT ELECTRODES OF STAGES OF A GATE DRIVER

(71) Applicant: Samsung Display Co., LTD., Yongin-si (KR)

(72) Inventors: Won Jun Lee, Yongin-si (KR); Tae Hoon Kwon, Yongin-si (KR); Sung Min Son, Yongin-si (KR); Geum Ju Moon, Yongin-si (KR)

(73) Assignee: Samsung Display Co., Ltd., Yogin's (KR)

( * ) Notice: Subject to any disclaimer, the term of this patent is extended or adjusted under 35 U.S.C. 154(b) by 0 days.

(21) Appl. No.: 19/016,183

(22) Filed: Jan. 10, 2025

(30) Foreign Application Priority Data

Apr. 23, 2024 (KR) ........................ 10-2024-0054090

(51) Int. Cl.
*H10K 59/131* (2023.01)
*G09G 3/32* (2016.01)
*G09G 3/3233* (2016.01)
*G09G 3/3266* (2016.01)
*H10K 59/40* (2023.01)
*H10K 59/88* (2023.01)

(52) U.S. Cl.
CPC ............. *G09G 3/3266* (2013.01); *G09G 3/32* (2013.01); *G09G 2310/0267* (2013.01); *G09G 2320/0204* (2013.01)

(58) Field of Classification Search
CPC ................... G09G 3/3266; G09G 3/32; G09G 2310/0267; G09G 2320/0204
See application file for complete search history.

(56) References Cited

U.S. PATENT DOCUMENTS

2018/0166018 A1* 6/2018 Yang .................... H10D 86/441
2021/0027704 A1* 1/2021 Tong .................... G09G 3/3225
2022/0208096 A1* 6/2022 Matsueda ............ G09G 3/3275
2024/0099086 A1* 3/2024 Yu ........................ H10K 59/131
2025/0087169 A1 3/2025 Lee et al.

FOREIGN PATENT DOCUMENTS

CN 107221536 B * 12/2019 ........... H10D 86/441
KR 10-2020-0014473 2/2020

* cited by examiner

*Primary Examiner* — Kwang-Su Yang
(74) *Attorney, Agent, or Firm* — Innovation Counsel LLP

(57) ABSTRACT

A display device includes: a display panel; a first gate line and a second gate line disposed on the display panel; and a gate driver connected to the first gate line and the second gate line, wherein a number of pixels connected to the first gate line is less than a number of pixels connected to the second gate line, wherein the gate driver comprises a first stage connected to the first gate line through a first output electrode and a second stage connected to the second gate line through a second output electrode, wherein the gate driver comprises a first compensation capacitor connected to the first output electrode, and a second compensation capacitor connected to the second output electrode, and wherein a capacitance of the first compensation capacitor is greater than a capacitance of the second compensation capacitor.

18 Claims, 16 Drawing Sheets

DISPLAY DEVICE HAVING COMPENSATION CAPACITORS CONNECTED TO OUTPUT ELECTRODES OF STAGES OF A GATE DRIVER

CROSS REFERENCE TO RELATED APPLICATION(S)

This application claims priority to and benefits of Korean Patent Application No. 10-2024-0054090 under 35 U.S.C. § 119, filed on Apr. 23, 2024, in the Korean Intellectual Property Office, the entire contents of which are incorporated herein by reference.

BACKGROUND

1. Technical Field

Embodiments relate to a display device, and more particularly, to a display device with improved display quality.

2. Description of the Related Art

An organic light-emitting display apparatus includes display elements having luminance varying depending on electric current, for example, organic light-emitting diodes.

SUMMARY

Aspects of the disclosure provide a display device with improved display quality.

However, embodiments are not limited to those set forth herein. The above and other embodiments will become more apparent to one of ordinary skill in the art to which the disclosure pertains by referencing the detailed description of the disclosure given below.

According to an embodiment, a display device may include: a display panel; a first gate line and a second gate line disposed on the display panel; and a gate driver connected to the first gate line and the second gate line, wherein a number of pixels connected to the first gate line may be less than a number of pixels connected to the second gate line, wherein the gate driver may include a first stage connected to the first gate line through a first output electrode and a second stage connected to the second gate line through a second output electrode, wherein the gate driver may include a first compensation capacitor connected to the first output electrode, and a second compensation capacitor connected to the second output electrode, and wherein a capacitance of the first compensation capacitor may be greater than a capacitance of the second compensation capacitor.

A length of the first gate line may be greater than a length of the second gate line.

The first compensation capacitor and the second compensation capacitor may be disposed in a non-display area of the display panel.

The first compensation capacitor and the second compensation capacitor may be disposed in the non-display area between the gate driver and a display area of the display panel.

The first compensation capacitor may include: a first capacitor electrode connected to the first output electrode; and a second capacitor electrode connected to a power line and overlapping the first capacitor electrode.

The power line transmits a direct-current (DC) voltage.

The second compensation capacitor may include: a first capacitor electrode connected to the second output electrode; and a second capacitor electrode connected to a power line and overlapping the first capacitor electrode of the second compensation capacitor.

The first capacitor electrode of the first compensation capacitor may have a larger size than the first capacitor electrode of the second compensation capacitor.

The second capacitor electrode of the first compensation capacitor may have a larger size than the second capacitor electrode of the second compensation capacitor.

A capacitance of the first compensation capacitor may be greater than a capacitance of the second compensation capacitor so that a load of the first stage connected to the first gate line may be substantially equal to a load of the second stage connected to the second gate line.

The display device may further include: a third gate line adjacent to the first gate line, wherein the gate driver may further include a third stage connected to the third gate line through a third output electrode, and wherein a number of pixels connected to the third gate line may be equal to a number of pixels connected to the first gate line.

A length of the third gate line may be substantially equal to a length of the first gate line.

The display device may further include: a third compensation capacitor connected to the third output electrode.

The first gate line may be disposed between the second gate line and the third gate line.

A capacitance of the third compensation capacitor may be substantially equal to the capacitance of the first compensation capacitor.

A capacitance of the third compensation capacitor may be less than the capacitance of the first compensation capacitor.

The display panel may include a display area where the first gate line and the second gate line are disposed; and a non-display area where the gate driver may be disposed.

The display area may include a first subsidiary display area and a second subsidiary display area having different sizes.

A length of the first gate line may be greater than a length of the second gate line, and a length of the first subsidiary display area may be greater than a length of the second subsidiary display area.

The first gate line may be disposed in the first subsidiary display area, and the second gate line may be disposed in the second subsidiary display area.

According to an embodiment, display quality of a display device may be improved by a compensation capacitor.

The effects according to the embodiments are not limited to those mentioned above and more various effects are included in the following description of the disclosure.

BRIEF DESCRIPTION OF THE DRAWINGS

The above and other aspects and features of the disclosure will become more apparent by describing embodiments thereof with reference to the attached drawings, in which.

DETAILED DESCRIPTION OF THE EMBODIMENTS

Figure 1:
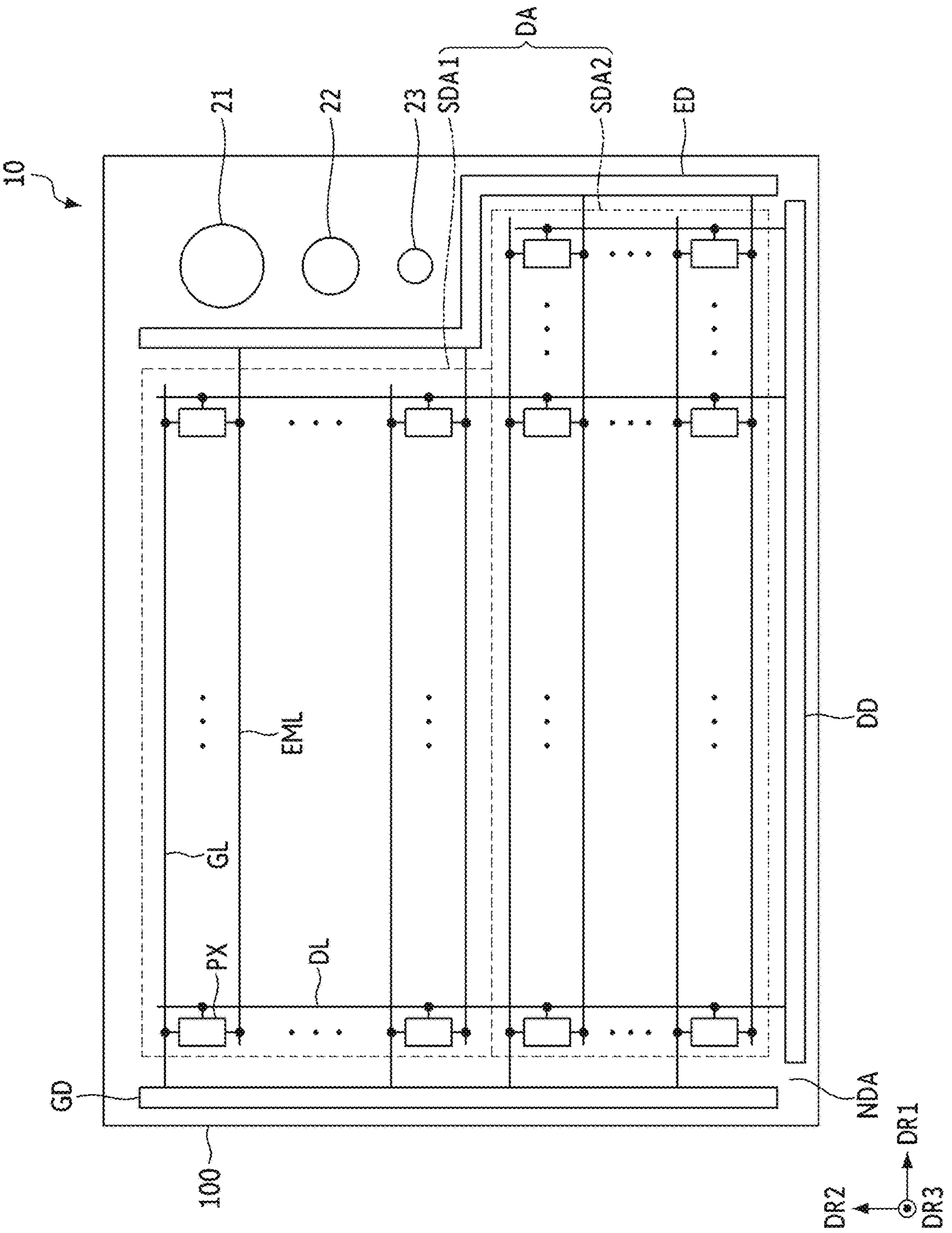
FIG. 1 is a schematic plan view of a display device according to an embodiment.

Advantages and features of the disclosure and methods to achieve them will become apparent from the descriptions of embodiments hereinbelow with reference to the accompanying drawings. However, the disclosure is not limited to embodiments disclosed herein but may be implemented in various different ways. The embodiments are provided for making the disclosure thorough and for fully conveying the scope of the disclosure to those skilled in the art. It is to be noted that the scope of the disclosure is defined only by the claims.

As used herein, a phrase "an element A on an element B" refers to that the element A may be disposed directly on the element B and/or the element A may be disposed indirectly on the element B via another element C. Like reference numerals denote like elements throughout the descriptions. The figures, dimensions, ratios, angles, numbers of elements given in the drawings are merely illustrative and are not limiting.

Although terms such as first, second, etc. are used to distinguish arbitrarily between the elements such terms describe, and thus these terms are not necessarily intended to indicate temporal or other prioritization of such elements. These terms are used to merely distinguish one element from another. Accordingly, as used herein, a first element may be a second element within the technical scope of the disclosure.

Features of various embodiments may be combined partially or totally. As will be clearly appreciated by those skilled in the art, technically various interactions and operations are possible. Various embodiments may be practiced individually or in combination.

Hereinafter, embodiments will be described with reference to the accompanying drawings.

FIG. 1 is a schematic plan view of a display device according to an embodiment.

Referring to FIG. 1, a display device 10 according to the embodiment may display moving images or still images. The display device 10 may be implemented by portable electronic devices such as a mobile phone, a smart phone, a tablet PC, a mobile communications terminal, an electronic notebook, an electronic book, a portable multimedia player (PMP), a navigation device and an ultra mobile PC (UMPC). For example, the display device 10 may be used as a display unit of a television, a laptop computer, a monitor, an electronic billboard, or the Internet of Things (IOT). In another example, the display device 10 be applied to a smart watch, a watch phone, or a head-mounted display (HMD) for implementing virtual reality and augmented reality.

The display device 10 may include a display panel 100, a gate driver GD, an emission driver ED, and a data driver DD.

The display panel 100 may have a shape similarly to a rectangular shape when viewed from the top (or in plan view). For example, the display panel 100 may have a shape similar to a rectangle having sides in the first direction DR1 and sides in the second direction DR2 intersecting the first direction DR1 when viewed from the top (or in plan view). In the display panel 100, the corners where the sides in the first direction DR1 meet the sides in the second direction DR2 may be rounded with a predetermined curvature or may be a right angle. The shape of the display panel 100 when viewed from the top (or in plan view) is not limited to a rectangular shape, but may be formed in a shape similar to other polygonal shapes, a circular shape, or an elliptical shape. The shape of the display device 10 may follow the shape of the display panel 100 when viewed from the top (or in plan view), but embodiments are not limited thereto.

The display panel 100 may include a display area DA where images are displayed, and a non-display area NDA surrounding the display area.

In the display area DA, pixels PX, gate lines GL, data lines DL and emission control lines EML may be disposed.

Each of the pixels PX may include a light-emitting element that emits light. The pixels PX may be arranged in a matrix in the first direction DR1 and the second direction DR2. The gate lines and the emission control lines may be extended in the first direction DR1 and may be arranged in the second direction DR2. The data lines DL may be extended in the second direction DR2 and may be arranged in the first direction DR1.

The gate lines GL may include write gate lines, control gate lines, initialization gate lines, and bias gate lines.

Each of the pixels PX may be connected to one write gate line among the write gate lines, one control gate line among the control gate lines, one initialization gate line among the initialization gate lines, one bias gate line among the bias gate lines, one emission control line EML among the emission control lines EML, and one data line DL among the data lines DL. Each of the pixels PX may receive a data voltage from a data line DL in response to a write gate signal from a write gate line GWL, and may allow a light-emitting element to emit light in response to the data voltage from the data line.

The display area DA may include, for example, a first subsidiary display area SDA1 and a second subsidiary display area SDA2. The gate lines GL may be arranged separately in the first subsidiary display area SDA1 and the second subsidiary display area SDA2. For example, one of the gate lines in the first subsidiary display area SDA1 may be defined as a first-type gate line, and one of the gate lines in the second sub-display area SDA2 may be defined as a second-type gate line. The number of pixels PX connected to the first-type gate line may be different from the number of pixels PX connected to the second-type gate line. For example, the number of pixels PX connected to the first-type gate line may be smaller than the number of pixels PX connected to the second-type gate line.

The gate lines GL (e.g., first-type gate line) of the first subsidiary display area SDA1 may have the same length, and the gate lines GL (e.g., second-type gate line) of the second subsidiary display area SDA2 may have the same length.

The first subsidiary display area SDA1 and the second subsidiary display area SDA2 may have different sizes. For example, in the first direction DR1, the first subsidiary display area SDA1 may have a smaller length than the second subsidiary display area SDA2. Accordingly, in the first direction DR1, the length of the gate line GL in the first subsidiary display area SDA1 may be smaller than the length of the gate line GL in the second subsidiary display area SDA2. For example, the first gate line (e.g., the first-type gate line) of the first subsidiary display area SDA1 may have a length smaller than the length of the second gate line (e.g., the second-type gate line) of the second subsidiary display area SDA2. For example, in the first direction DR1, the length of the emission control line EML in the first subsidiary display area SDA1 may be smaller than the length of the emission control line EML in the second subsidiary display area SDA2.

The gate driver GD connected to the gate lines GL, the emission driver ED, and the data driver DD connected to the data lines DL may be disposed in the non-display area NDA.

The gate driver GD may include a write gate signal output that outputs write gate signals and sequentially provides the write gate signals to write gate lines; a control gate signal output that outputs control gate signals and sequentially provides them to control gate lines; an initialization gate signal output that outputs initialization gate signals and sequentially provides them to initialization gate lines; and a bias gate signal output that outputs bias gate signals and provides the bias gate signals sequentially to bias gate lines.

The emission driver ED may output emission control signals and sequentially provide the emission control signals to the emission control lines EML.

The data driver DD may convert digital video data into analog data voltages and output the analog data voltages to the data lines DL. In this instance, pixels are selected by the write gate signal from the gate driver GD, and data voltages may be applied to the selected pixels.

At an edge of the display panel 100, a first through hole 21, a second through hole 22 and a third through hole 23 may penetrate the display panel 100 in the third direction DR3. At least one electronic component may be disposed in the first through hole 21, the second through hole 22, and the third through hole 23. The electronic component may be an electronic device using light or sound. The electronic device may be, for example, a sensor for measuring distance, such as a proximity sensor, a sensor for recognizing a part of a user's body (e.g., a fingerprint, an iris, a face, etc.), a small lamp for outputting light, or an image sensor for capturing an image (e.g., a camera). The electron device using light may use lights in various wavelength bands such as visible light, infrared light, and ultraviolet light. The electron device using sound may use ultrasonic waves or sounds in other frequency bands. In some embodiments, the electronic component 20 may include sub-components such as a light emitter and a light receiver. The light emitter and the light receiver may be integrated as a single element, or a pair of light emitter and a light receiver physically separated from each other may form a single electronic component.

Figure 2:
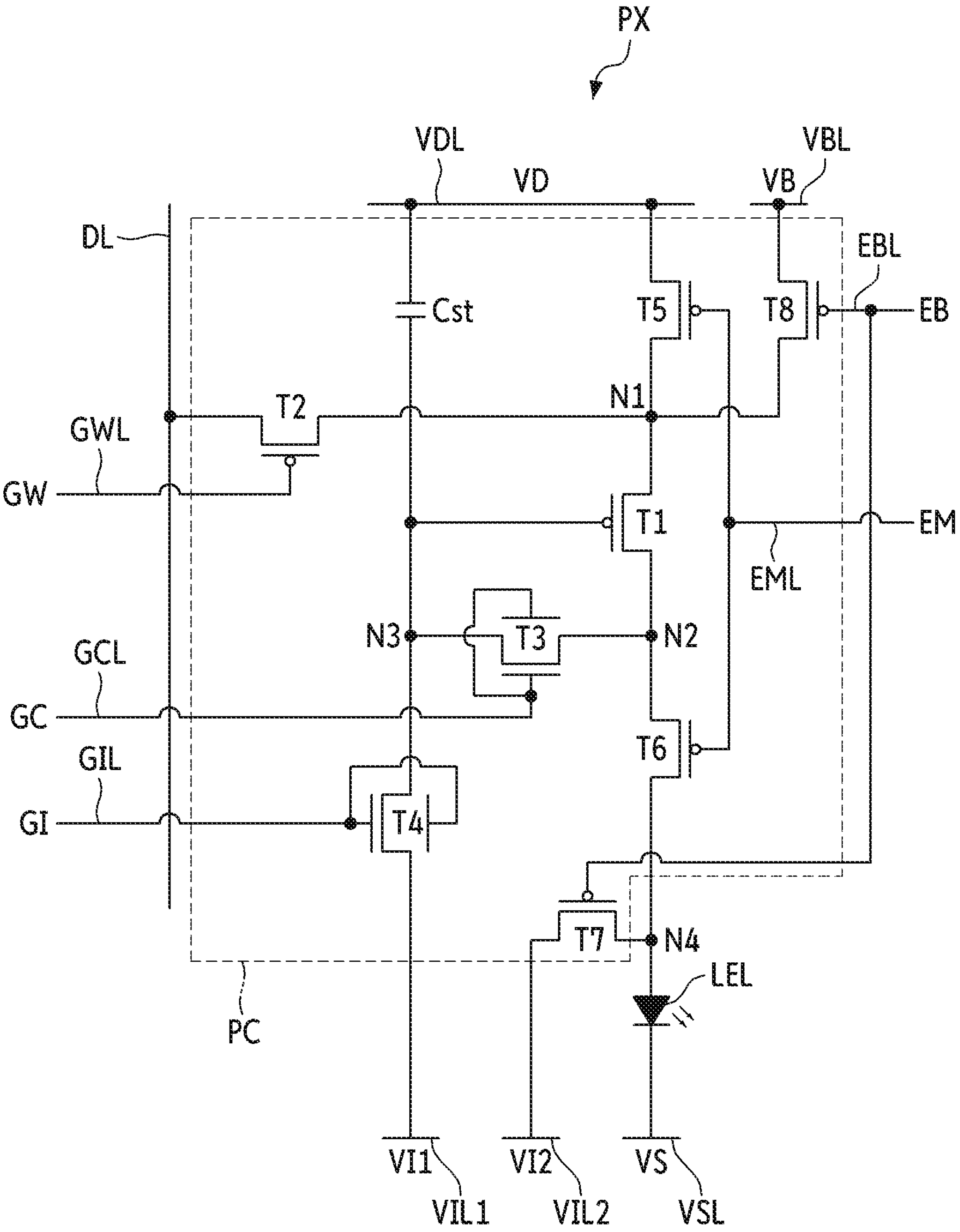
FIG. 2 is a schematic diagram of an equivalent circuit of a pixel of a display device according to an embodiment.

FIG. 2 is a schematic diagram of an equivalent circuit of a pixel PX of a display device according to an embodiment. For example, FIG. 2 may be a schematic diagram of an equivalent circuit of the pixel PX of FIG. 1.

As shown in FIG. 2, the pixel PX may be connected to a write gate line GWL, a control gate line GCL, an initialization gate line GIL, a bias gate line EBL, an emission control line EML, a data line DL, a driving voltage line VDL, a common voltage line VSL, a first initialization voltage line VIL1, a second initialization voltage line VIL2 and a bias voltage line VBL.

A pixel PX may include a pixel circuit PC and a light-emitting element LEL. The pixel circuit PC may include a first transistor T1, a second transistor T2, a third transistor T3, a fourth transistor T4, a fifth transistor T5, a sixth transistor T6, a seventh transistor T7, an eighth transistor T8, and a capacitor Cst.

The first transistor T1 may include a gate electrode, a source electrode, and a drain electrode. The first transistor T1 may control a source-drain current (hereinafter referred to as a driving current) according to a data voltage applied to the gate electrode. The driving current (e.g., Isd) flowing through the channel region of the first transistor T1 may be proportional to the square of the difference between the threshold voltage Vth and the voltage Vsg between the source electrode and the gate electrode of the first transistor T1 ($Isd=k\times(Vsg-Vth)^2$), where k denotes a proportional coefficient determined by the structure and physical properties of the first transistor T1, Vsg denotes the source-gate voltage of the first transistor T1, and Vth denotes the threshold voltage of the first transistor T1.

The light-emitting element LEL may receive the driving current Isd to emit light. The amount or the luminance of the light emitted from the light-emitting element LEL may be proportional to the magnitude of the driving current Isd.

The light-emitting element LEL may be an organic light-emitting diode including a first electrode, a second electrode, and an organic light-emitting layer disposed between the first electrode and the second electrode. In another example, the light-emitting element LEL may be an inorganic light-emitting element including a first electrode, a second electrode, and an inorganic semiconductor disposed between the first electrode and the second electrode. In another example, the light-emitting element LEL may be a quantum-dot light-emitting element including a first electrode, a second electrode, and a quantum-dot emissive layer between the first electrode and the second electrode. As another example, the light-emitting element LEL may be a micro light-emitting diode.

The first electrode of the light-emitting element LEL may be electrically connected to a fourth node N4. The first electrode of the light-emitting element LEL may be connected to the drain electrode of the sixth transistor T6 and the source electrode of the seventh transistor T7 through the fourth node N4. The second electrode of the light-emitting element LEL may be connected to the common voltage line VSL. The second electrode of the light-emitting element LEL may receive a second driving voltage VS (e.g., a low-level voltage) from the common voltage line VSL.

The second transistor T2 may be turned on by a first gate signal GS1 (GW) of the write gate line GWL to electrically connect the data line DL with a first node N1, which is the source electrode of the first transistor T1. The second transistor T2 may be turned on in response to the first gate signal GS1 to apply data voltage to the first node N1. The gate electrode of the second transistor T2 may be electrically connected to the write gate line GWL, the source electrode of the second transistor T2 may be electrically connected to the data line DL, and the drain electrode of the second transistor T2 may be electrically connected to the first node N1.

The third transistor T3 may be turned on by a second gate signal GS2 (CG) of the control gate line GCL and may electrically connect a second node N2 that is the drain electrode of the first transistor T1 with a third node N3 that is the gate electrode of the first transistor T1. The third transistor T3 may be connected between the third node N3 and the second node N2. For example, the gate electrode of the third transistor T3 may be electrically connected to the control gate line GCL, the source electrode of the third transistor T3 may be electrically connected to the third node N3, and the drain electrode of the third transistor T3 may be electrically connected to the second node N2. The third transistor T3 may be turned on by a second gate signal GS2 of the control gate line GCL and may electrically connect a second node N2 that is the drain electrode of the first transistor T1 with a third node N3 that is the gate electrode of the first transistor T1. The third transistor T3 may be a double-gate transistor having two gate electrodes (e.g., a gate electrode and a counter gate electrode). The gate electrode and the counter gate electrode may face each other on different layers. The third transistor T3 may be turned on by a control gate signal GC and may be connected to the pixel circuit PC like a diode.

The fourth transistor T4 may be turned on by a third gate signal GS3 (GI) of the initialization gate line GIL to electrically connect the third node N3 that is the gate electrode of the first transistor T1 with the first initialization voltage line VIL1. The fourth transistor T4 may be connected in series between the third node N3 and the first initialization voltage line VIL1. For example, the gate electrode of the fourth transistor T4 may be electrically connected to the initialization gate line GIL, the source electrode of the fourth transistor T4 may be electrically connected to the third node N3, and the drain electrode of the fourth transistor T4 may be electrically connected to the first initialization voltage line VIL1. The fourth transistor T4 may be a double-gate transistor. The first initialization voltage line VIL1 may transmit a first initialization voltage VI1.

The fifth transistor T5 may be turned on by an emission control signal EM of the emission control line EML and may electrically connect the driving voltage line VDL with the first node N1 that is the source electrode of the first transistor T1. The gate electrode of the fifth transistor T5 may be electrically connected to the emission control line EML, the source electrode of the fifth transistor T5 may be electrically connected to the driving voltage line VDL, and the drain electrode of the fifth transistor T5 may be electrically connected to the first node N1.

The sixth transistor T6 may be turned on by the emission control signal EM of the emission control line EML to electrically connect the second node N2 which is the drain electrode of the first transistor T1 with the fourth node N4 that is the first electrode of the light-emitting element LEL. The gate electrode of the sixth transistor T6 may be electrically connected to the emission control line EML, the source electrode of the sixth transistor T6 may be electrically connected to the second node N2, and the drain electrode of the sixth transistor T6 may be electrically connected to the fourth node N4.

In case that all of the fifth transistor T5, the first transistor T1 and the sixth transistor T6 are turned on, the driving current may be supplied to the light-emitting element LEL.

The seventh transistor T7 may be turned on by a fourth gate signal GS4 (GB) from the bias gate line EBL to electrically connect the fourth node N4 that is the first electrode of the light-emitting element LEL with the second initialization voltage line VIL2. As the seventh transistor T7 is turned on based on the fourth gate signal GS4, the first electrode of the light-emitting element LEL may be discharged to the second initialization voltage VI2. The gate electrode of the seventh transistor T7 may be electrically connected to the bias gate line EBL, the source electrode of the seventh transistor T7 may be electrically connected to the fourth node N4, and the drain electrode of the seventh transistor T7 may be electrically connected to the second initialization voltage line VIL2. The second initialization voltage line VIL2 may transmit the second initialization voltage VI2.

The eighth transistor T8 may be turned on by the fourth gate signal GS4 (EB) of the bias gate line EBL to electrically connect the bias voltage line VBL with the first node N1 that is the source electrode of the first transistor T1. The eighth transistor T8 may be turned on based on the fourth gate signal GS4 to apply the bias voltage VB to the first node N1. The eighth transistor T8 may improve hysteresis of the first transistor T1 by applying the bias voltage VB to the source electrode of the first transistor T1. The gate electrode of the eighth transistor T8 may be electrically connected to the bias gate line EBL, the source electrode of the eighth transistor T8 may be electrically connected to the bias voltage line VBL, and the drain electrode of the eighth transistor T8 may be electrically connected to the first node N1.

Each of the first transistor T1, the second transistor T2, the fifth transistor T5, the sixth transistor T6, the seventh transistor T7 and the eighth transistor T8 may include a silicon-based active layer. For example, each of the first transistor T1, the second transistor T2, the fifth transistor T5, the sixth transistor T6, the seventh transistor T7 and the eighth transistor T8 may be a p-type transistor including an active layer made of low-temperature polycrystalline silicon (LTPS). The active layer made of low-temperature polycrystalline silicon may have a high electron mobility and excellent turn-on characteristics. Accordingly, as the display device 100 includes transistors having excellent turn-on characteristics, the pixels PX may be driven stably and efficiently. Each of the first transistor T1, the second transistor T2, the fifth transistor T5, the sixth transistor T6, the seventh transistor T7 and the eighth transistor T8 may output the current introduced from the source electrode via the drain electrode based on a gate-low voltage applied to the gate electrode.

The third transistor T3 and the fourth transistor T4 may be n-type transistors including an oxide-based active layer. A transistor including an oxide-based active layer may have a coplanar structure in which a gate electrode is disposed at the top. A transistor including an oxide-based active layer may output current introduced into the drain electrode via the source electrode based on a gate-high voltage applied to the gate electrode.

The capacitor Cst may be electrically connected between the third node N3 which is the gate electrode of the first transistor T1 and the driving voltage line VDL. For example, the first electrode of the capacitor Cst may be electrically connected to the third node N3, and the second electrode of the capacitor Cst may be electrically connected to the driving voltage line VDL, so that a potential difference between the driving voltage line VDL and the gate electrode of the first transistor T1 may be maintained.

Figure 3:
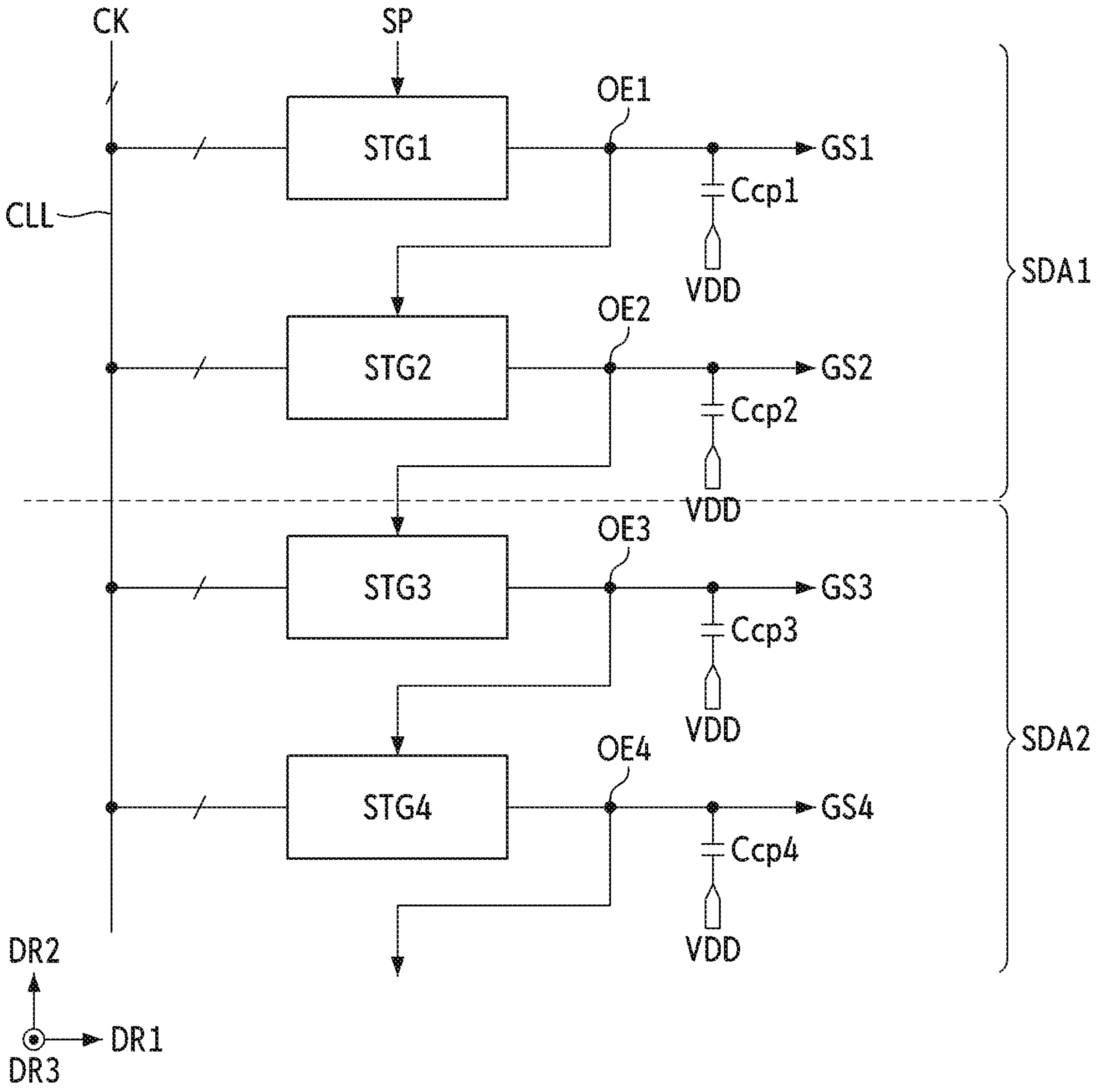
FIG. 3 is a schematic block diagram showing the gate driver.

FIG. 3 is a schematic block diagram showing the gate driver GD. For example, FIG. 3 may show operation of the control gate signal output of the gate driver GD.

As shown in FIG. 3, the gate driver GD may include stages STG1 to STG4.

Each of the stages STG1 to STG4 may be set according to a gate signal from the previous stage. The set stages STG1 to STG4 may output gate signals based on a clock signal CK supplied through a clock line CLL. For example, after the second stage STG2 is set according to the first gate signal GS1 from the first stage STG1, the second stage STG2 may output the second gate signal GS2 based on the clock signal CK supplied through the clock line CLL.

In another example, the clock line may include a plurality of clock lines CLL. The plurality of clock lines CLL may transmit a plurality of clock signals CK of different phases.

For example, the first stage STG1 may be set by a start signal SP supplied through a start line.

The stages STG1 to STG4 may be connected to gate lines, respectively. For example, a first output electrode OE1 of the first stage STG1 may be connected to a first gate line (e.g., a first control gate line), a second output electrode OE2 of the second stage STG2 may be connected to a second gate line (e.g., a second control gate line), a third output electrode OE3 of the third stage STG3 may be connected to a third gate line (e.g., a third control gate line), and a fourth output electrode OE4 of the fourth stage STG4 may be connected to a fourth gate line (e.g., a fourth control gate line).

The output electrodes of the stages STG1 to STG4 may also be connected to the respective subsequent stages. For example, the first output electrode OE1 of the first stage STG1 may be connected to the second stage STG2, the second output electrode OE2 of the second stage STG2 may be connected to the third stage STG3, the third output electrode OE3 of the third stage STG3 may be connected to the fourth stage STG4, and the fourth output electrode OE4 of the fourth stage STG4 may be connected to the subsequent stage. Accordingly, the first gate signal from the first stage STG1 may be supplied to the first gate line and the second stage STG2, the second gate signal from the second stage STG2 may be supplied to the second gate line and the third stage STG3, the third gate signal from the third stage STG3 may be supplied to the third gate line and the fourth stage STG4, and the fourth gate signal from the fourth stage STG4 may be supplied to the fourth gate line and the subsequent stage.

A gate signal provided to a gate line may drive the gate line, and a gate signal supplied to a subsequent stage may drive the subsequent stage. For example, a gate signal provided to a subsequent stage may set (or enable) the subsequent stage.

A compensation capacitor may be connected to the output electrode of each of the stages. For example, a first compensation capacitor Ccp1 may be connected to the first output electrode OE1 of the first stage STG1, a second compensation capacitor Ccp2 may be connected to the second output electrode OE2 of the second stage STG2, a third compensation capacitor Ccp3 may be connected to the third output electrode OE3 of the third stage STG3, and a fourth compensation capacitor Ccp4 may be connected to the fourth output electrode OE4 of the fourth stage STG4.

The compensation capacitors in different subsidiary display areas may have different capacitances. For example, a stage for driving a gate line of the first subsidiary display area SDA1 may be connected to a compensation capacitor with a larger capacitance than a capacitance of a compensation capacitor of a stage for driving a gate line of the second subsidiary display area SDA3. For example, a stage for driving a shorter gate line may be connected to a compensation capacitor with a larger capacitance than a capacitance of a compensation capacitor of a stage for driving a longer gate line. For example, in case that the first stage STG1 and the second stage STG2 of FIG. 3 are connected to the gate lines of the first subsidiary display area SDA1, and the third stage STG3 and the fourth stage STG4 of FIG. 3 are connected to the gate lines of the second subsidiary display area SDA2, the capacitance of the first compensation capacitor Ccp1 connected to the first output electrode OE1 of the first stage STG1 may be smaller than that of the third compensation capacitor Ccp3 connected to the third output electrode OE3 of the third stage STG3. In this instance, the capacitance of the third compensation capacitor Ccp3 connected to the second output electrode OE2 of the second stage STG2 may be substantially equal to the capacitance of the first compensation capacitor Ccp1 described above, and the capacitance of the fourth compensation capacitor Ccp4 connected to the fourth output electrode OE4 of the fourth stage STG4 may be substantially equal to the capacitance of the third compensation capacitor Ccp3 described above.

As described above, since the compensation capacitor of a gate line connected to a smaller number of pixels (e.g., a first-type gate line) has a larger capacitance than the compensation capacitor of a gate line connected to a larger number of pixels (e.g., a second-type gate line), the load of the stage connected to the first-type gate line may be substantially equal to the load of the stage connected to the second-type gate line. For example, since a stage connected to a larger number of pixels (e.g., a first-type stage connected to the first-type gate line) may have a larger load than a stage connected to a smaller number of pixels (e.g., a second-type stage connected to the second-type gate line), the compensation capacitor connected to the output electrode of the first-type stage may have a larger capacitance than the compensation capacitor connected to the output electrode of the second-type stage, as described above. Therefore, the first-type stage and the second-type stage may have substantially the same load. For example, the capacitance of the compensation capacitor connected to the first-type stage may be different from the capacitance of the compensation capacitor connected to the second-type stage so that the loads of the first-type stage and the second-type stage connected to different numbers of pixels may become equal to each other. Accordingly, the luminance difference between the first sub-display area SDA1 and the second sub-display area SDA2 may be reduced, thereby improving the display quality of the display device.

For example, since a compensation capacitor connected to a shorter gate line has a larger capacitance than a compensation capacitor connected to a longer gate line, the load of the stage connected to the shorter gate line may be substantially equal to the load of the stage connected to the longer gate line. Accordingly, the luminance difference between the first sub-display area SDA1 and the second sub-display area SDA2 may be reduced, thereby improving the display quality of the display device.

Figure 4:
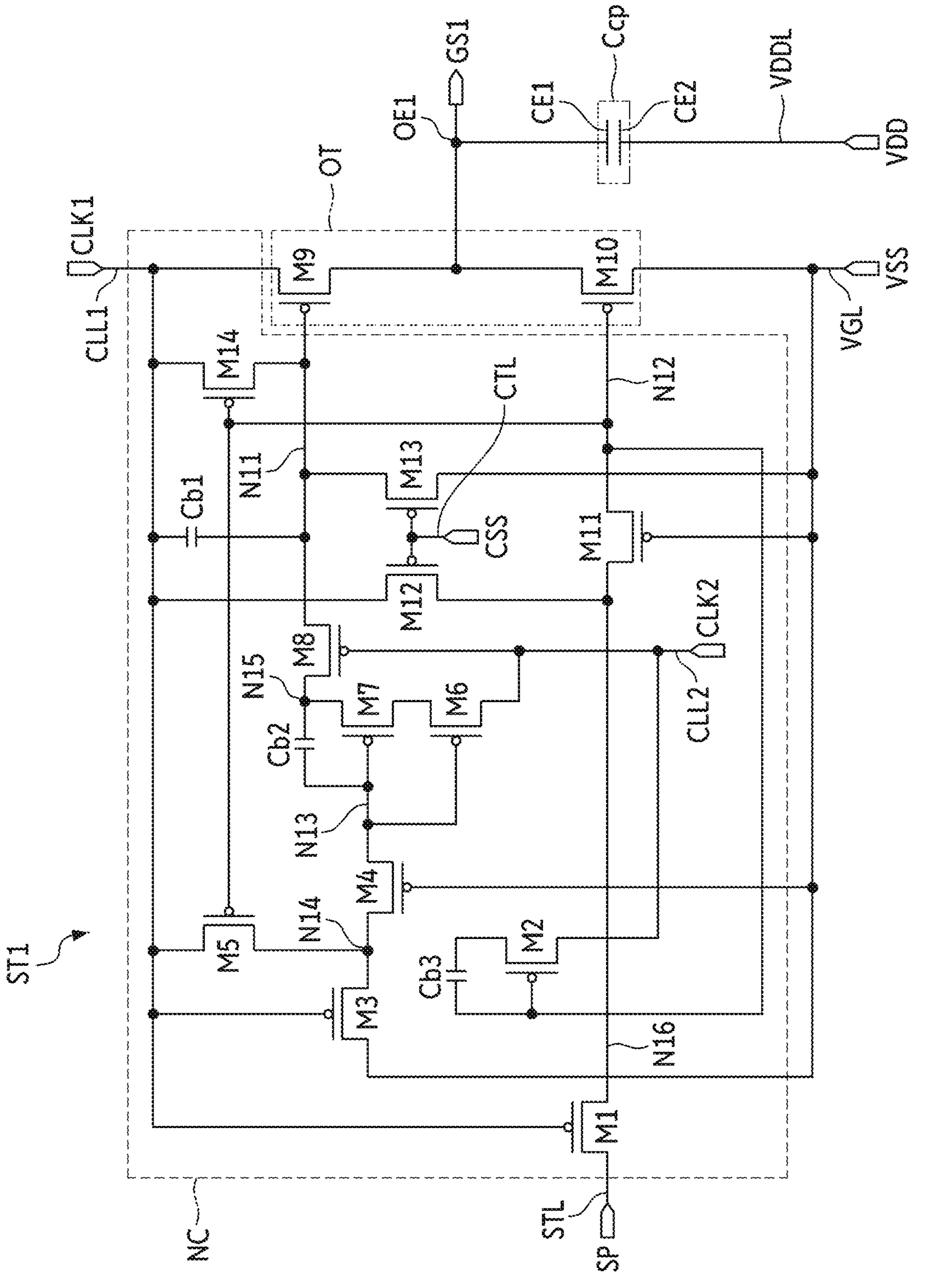
FIG. 4 is a schematic diagram showing a configuration of a stage according to an embodiment.

FIG. 4 is a schematic diagram showing a configuration of a stage according to an embodiment. For example, FIG. 4 may be a schematic diagram showing the first stage STG1 of FIG. 3.

The first stage STG1 may include a node control unit NC that controls the voltage of the nodes (e.g., the first node N11, the second node N12, the third node N13 and the fourth node N14), and an output unit OT connected to the node control unit NC.

The node controller NC may include a first transistor M1, a second transistor M2, a third transistor M3, a fourth transistor M4, a fifth transistor M5, a sixth transistor M6, a seventh transistor M7, an eighth transistor M8, an eleventh transistor M11, a twelfth transistor M12, a thirteenth transistor M13, a fourteenth transistor M14, a first capacitor Cb1, a second capacitor Cb2, and a third capacitor Cb3.

The output unit OT may include a ninth transistor M9 and a tenth transistor M10.

The first transistor M1 may include a gate electrode connected to a first clock line CLL1. The first transistor M1 may be connected between the start line STL and the second node N12. The gate electrode of the first transistor M1 of each of the second stage STG2 and the subsequent stages may be connected to the output electrode of the respective previous stage, instead of the start line STL. For example, the first transistor M1 of the second stage STG2 may be connected between the first output electrode OE1 of the first stage STG1 and a sixth node N16 of the second stage STG2. A first clock signal CLK1 may be applied to the first clock line CLL1.

The second transistor M2 may include a gate electrode connected to the first node N11. The second transistor M2 may be connected between the third capacitor Cb3 and a second clock line CLL2. A second clock signal CLK2 may be applied to the second clock line CLL2. The second clock signal CLK2 and the first clock signal CLK1 may have different phases.

The third transistor M3 may include a gate electrode connected to the first clock line CLL1. The third transistor M3 may be connected between a first power line VGL and the fourth node N14.

The fourth transistor M4 may include a gate electrode connected to the first power line VGL. The fourth transistor M4 may be connected between the fourth node N14 and the third node N13.

The fifth transistor M5 may include a gate electrode connected to the second node N12. The fifth transistor M5 may be connected between the first clock line CLL1 and the fourth node N14.

The sixth transistor M6 may include a gate electrode connected to the third node N13. The sixth transistor M6 may be connected between the seventh transistor M7 and the second clock line CLL2.

The seventh transistor M7 may include a gate electrode connected to the third node N13. The seventh transistor M7 may be connected between a fifth node N15 and the seventh transistor M7.

The eighth transistor M8 may include a gate electrode connected to the second clock line CLL2. The eighth transistor M8 may be connected between the fifth node N15 and the first node N11.

The ninth transistor M9 may include a gate electrode connected to the first node N11. The ninth transistor M9 may be connected between the first clock line CLL1 and the first output electrode OE1 of the first stage STG1. The first output electrode OE1 of the first stage STG1 may be connected to the first gate line. For example, the first output electrode OE1 of the first stage STG1 may be connected to the first gate line.

The tenth transistor M10 may include a gate electrode connected to the second node N12. The tenth transistor M10 may be connected between the first output electrode OE1 of the first stage STG1 and the first power line VGL.

The eleventh transistor M11 may include a gate electrode connected to the first power line VGL. The eleventh transistor M11 may be connected between the sixth node N16 and the second node N12.

The twelfth transistor M12 may include a gate electrode connected to a control line CTL supplying a control signal CSS. The twelfth transistor M12 may be connected between the first clock line CLL1 and the sixth node N16.

The thirteenth transistor M13 may include a gate electrode connected to the control line CTL. The thirteenth transistor M13 may be connected between the first node N11 and the first power line VGL.

The fourteenth transistor M14 may include a gate electrode connected to the second node N12. The fourteenth transistor M14 may be connected between the first clock line CLL1 and the first node N11.

The first capacitor Cb1 may be connected between the first clock line CLL1 and the first node N11.

The second capacitor Cb2 may be connected between the third node N13 and the fifth node N15.

The third capacitor Cb3 may be connected between the second node N12 and the second transistor M2.

A compensation capacitor may be connected to the output electrode of each of the stages. For example, the first compensation capacitor Ccp1 may be connected between the first output electrode OE1 of the first stage STG1 and a second supply voltage line VDDL. A first capacitor electrode of the first compensation capacitor Ccp1 may be connected to the first output electrode OE1 of the first stage STG1, and a second capacitor electrode of the first compensation capacitor Ccp1 may be connected to the second supply voltage line VDDL.

The first power line VGL may transmit a first supply voltage VSS, and the second supply voltage line VDDL may transmit a second supply voltage VDD.

Each of the first supply voltage VSS and the second supply voltage VDD may be a direct-current (DC) voltage. The second supply voltage VDD may be greater than the first supply voltage VSS.

Figure 5:
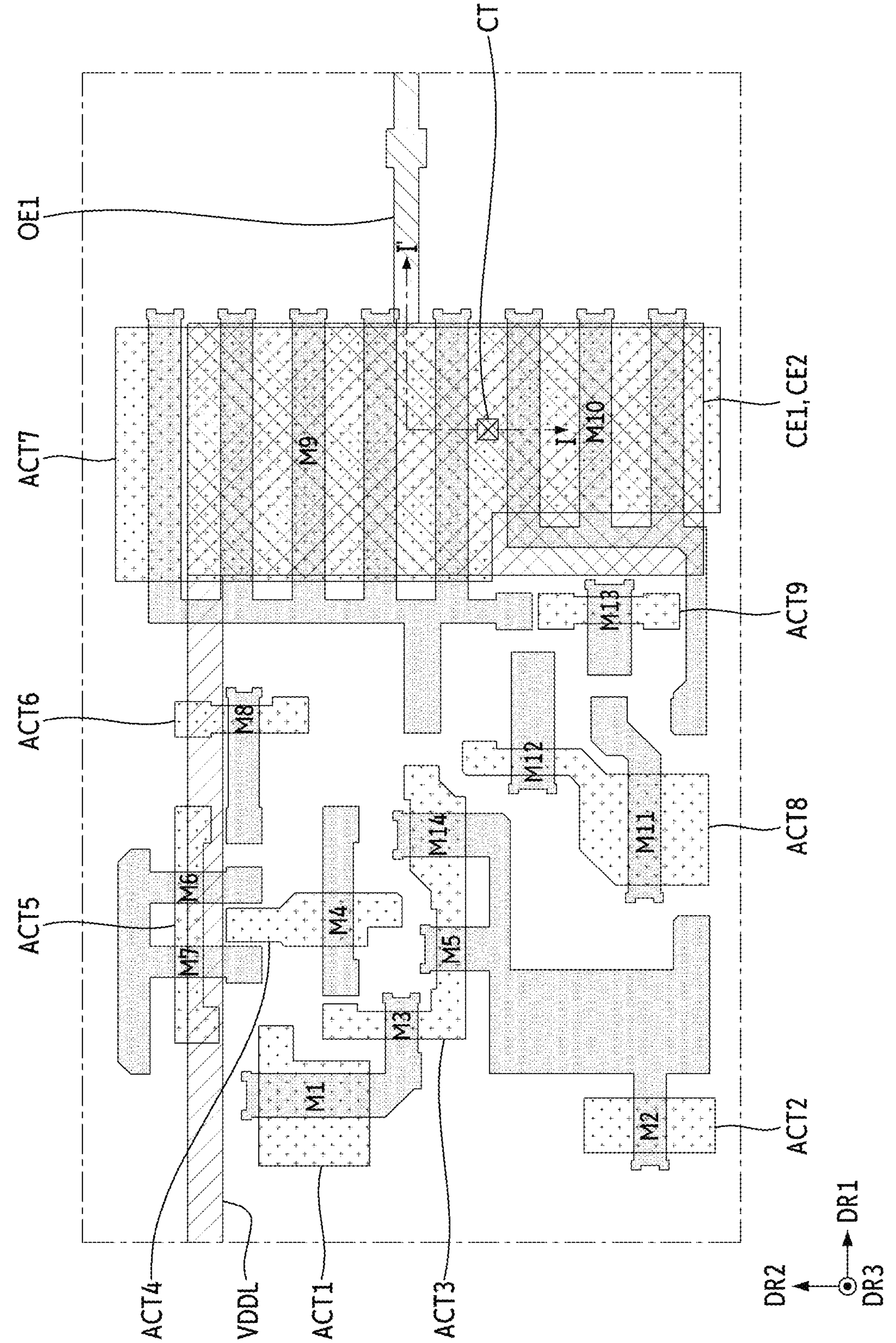
FIG. 5 is a schematic diagram showing an array of a stage according to an embodiment.
Figure 6:
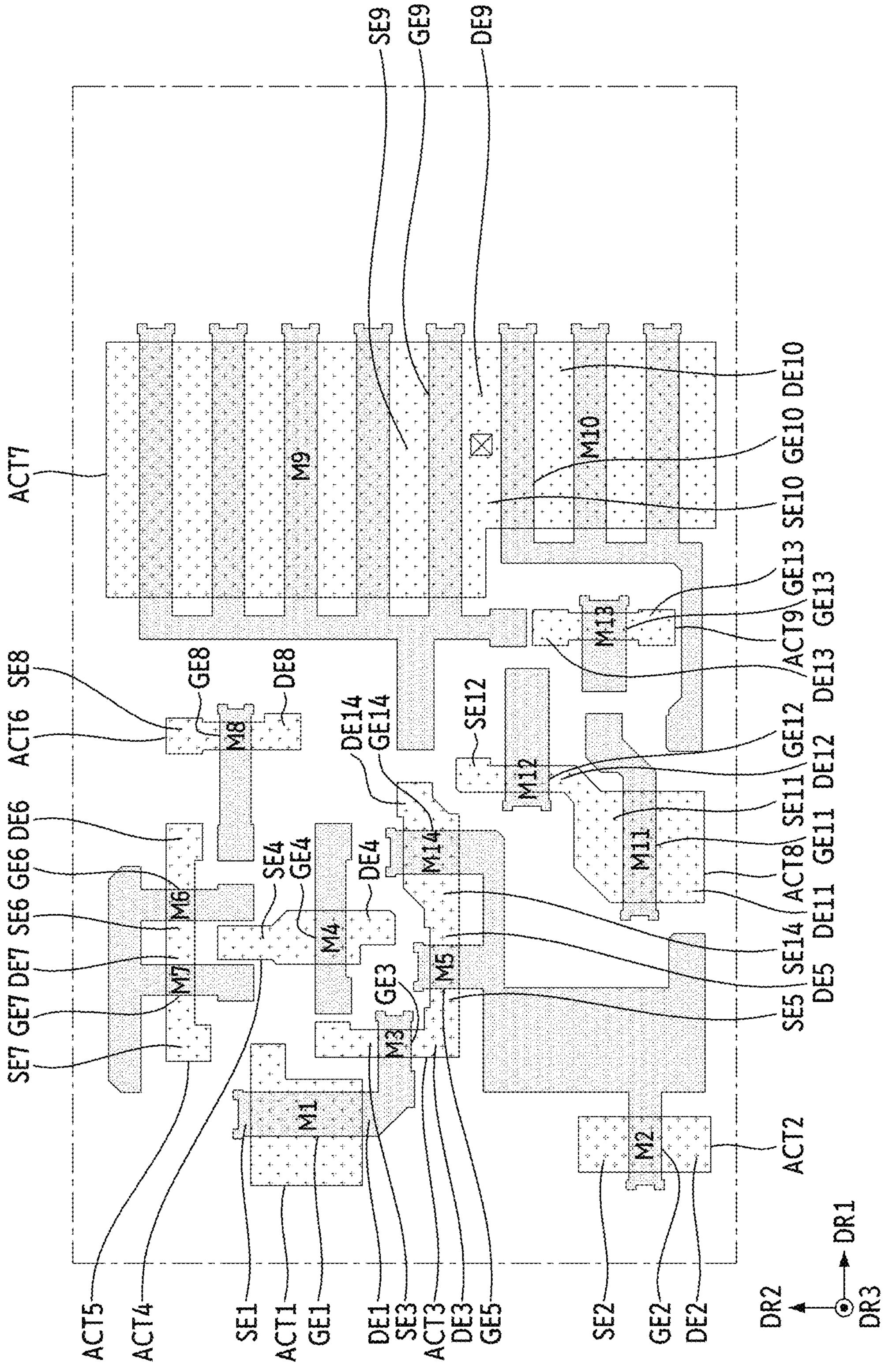
FIG. 6 is a schematic diagram selectively showing only the active layers and the gate electrode layers in FIG. 5.
Figure 7:
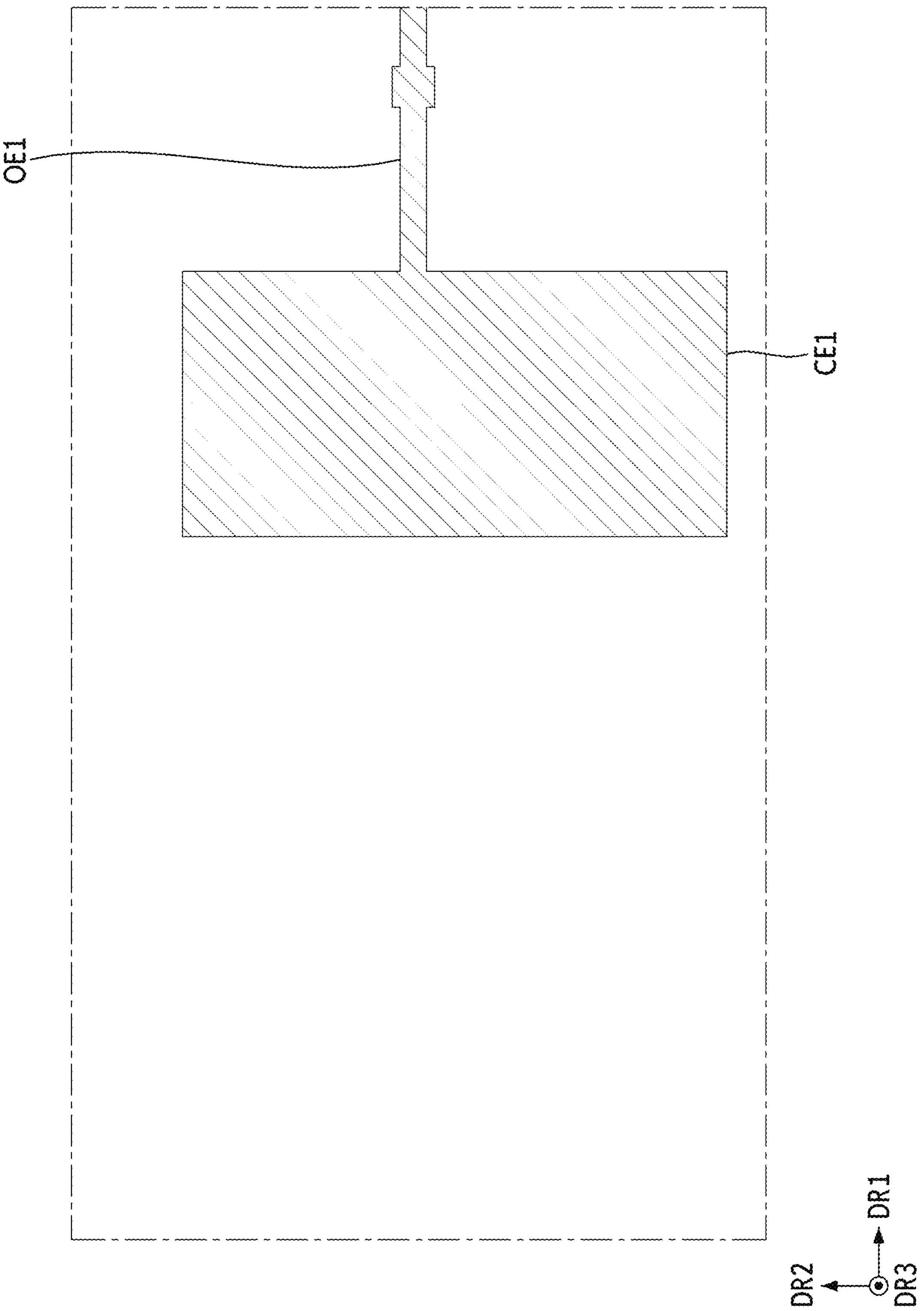
FIG. 7 is a schematic diagram selectively showing only the first output electrode and the first capacitor electrode in FIG. 5.
Figure 8:
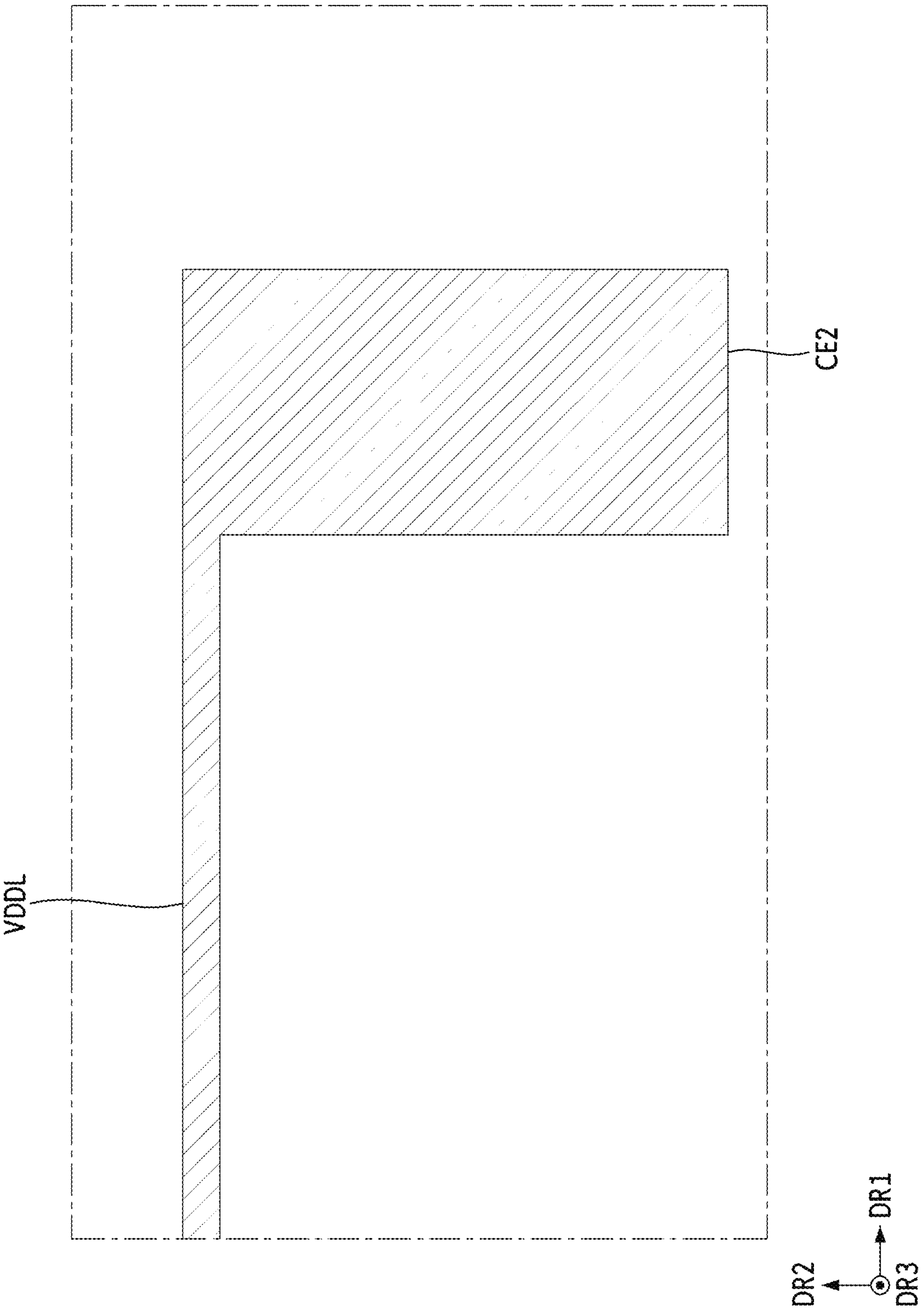
FIG. 8 is a schematic diagram selectively showing only the second supply voltage line and the second capacitor electrode in FIG. 5.
Figure 9:
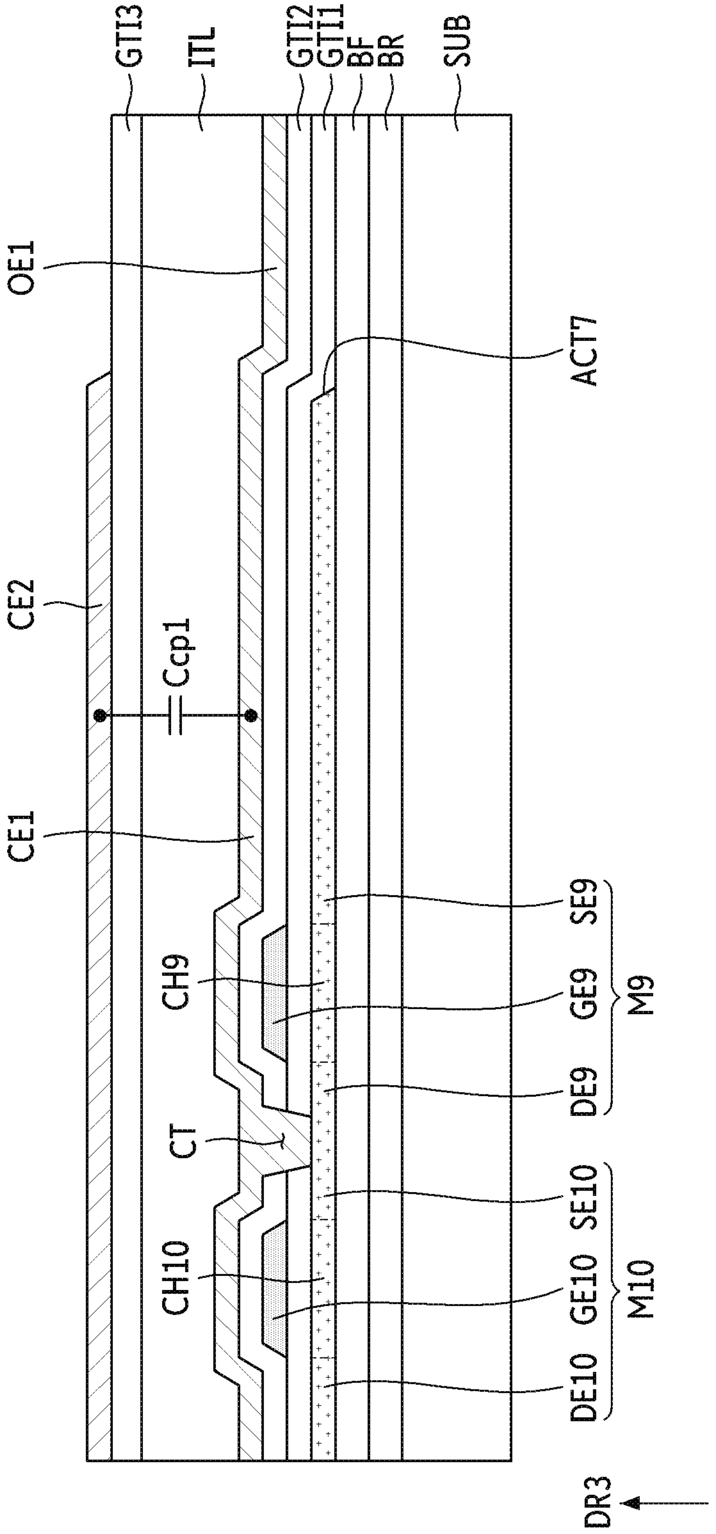
FIG. 9 is a schematic cross-sectional view taken along line I-I' of FIG. 5.

FIG. 5 is a schematic diagram showing an array of a stage according to an embodiment. For example, FIG. 5 may be a schematic diagram showing the array of the first stage STG1 of FIG. 4 described above. FIG. 6 is a schematic diagram selectively showing only the active layers and gate electrode layers in FIG. 5, and FIG. 7 is a schematic diagram selectively showing only the first output electrode OE1 and the first capacitor electrode CE1 in FIG. 5. FIG. 8 is a schematic diagram selectively showing only the second supply voltage line and the second capacitor electrode CE2 in FIG. 5. FIG. 9 is a cross-sectional view taken along line I-I' of FIG. 5.

Referring to FIG. 9, a substrate SUB may be a rigid substrate or a flexible substrate that is bendable, foldable, rollable, and so on. The substrate SUB may be made of an insulating material such as glass, quartz and a polymer resin. Examples of the polymer material may include polyethersulphone (PES), polyacrylate (PA), polyacrylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP) or a combination thereof. In another example, the substrate SUB may include a metallic material.

A barrier layer BR may be disposed on the substrate SUB. The barrier layer BR may be disposed on the entire surface of the substrate SUB. The barrier layer BR may be a film for protecting the thin-film transistors T1 to T8 from the moisture permeating through the substrate SUB that is vulnerable to moisture. The barrier layer BR may be made up of multiple inorganic films stacked on one another alternately. For example, the barrier layer BR may be made up of multiple layers in which one or more inorganic layers of a silicon nitride layer, a silicon oxynitride layer, a silicon oxide layer, a titanium oxide layer and an aluminum oxide layer are alternately stacked on one another.

A buffer layer BF may be disposed on the barrier layer BR. The buffer layer BF may be disposed on the entire surface of the substrate SUB including the barrier layer BR. The buffer layer BF may be a film for protecting the transistors T1 to T8 from moisture permeating through the substrate SUB, which is vulnerable to permeation of moisture. The buffer layer BF may be formed of inorganic films stacked on one another alternately. For example, the buffer layer BF may be made up of multiple layers in which one or more inorganic layers of a silicon nitride layer, a silicon oxynitride layer, a silicon oxide layer, a titanium oxide layer and an aluminum oxide layer are alternately stacked on one another.

A first active layer ACT1, a second active layer ACT2, a third active layer ACT3, a fourth active layer ACT4, a fifth active layer ACT5, a sixth active layer ACT6, a seventh active layer ACT7, an eighth active layer ACT8, and a ninth active layer ACT9 may be disposed on the buffer layer BF. As shown in FIG. 9, the seventh active layer ACT7 may include a channel region CH9 of the ninth transistor, a ninth source electrode SE9 of the ninth transistor M9, a ninth drain electrode DE9 of the ninth transistor M9, a channel region CH10 of the tenth transistor M10, a tenth source electrode SE10 of the tenth transistor M10, and a tenth drain electrode DE10 of the tenth transistor M10. Each of the active layers may be made of low temperature polycrystalline silicon (LTPS).

A first gate insulator GTI1 may be disposed on the first active layer ACT1, the second active layer ACT2, the third active layer ACT3, the fourth active layer ACT4, the fifth active layer ACT5, the sixth active layer ACT6, the seventh active layer ACT7, the eighth active layer ACT8, and the ninth active layer ACT9. The first gate insulator GTI1 may be disposed on the entire surface of the substrate SUB including the first active layer ACT1, the second active layer ACT2, the third active layer ACT3, the fourth active layer ACT4, the fifth active layer ACT5, the sixth active layer ACT6, the seventh active layer ACT7, the eighth active layer ACT8, and the ninth active layer ACT9. The first gate insulator GTI1 may include at least one of tetraethoxysilane (tetraethyl orthosilicate, TEOS), silicon nitride ($SiN_x$), and silicon oxide ($SiO_2$). For example, the first gate insulator GTI1 may have a double layer structure in which a silicon nitride film having the thickness of 40 nm and a tetraethoxysilane layer having the thickness of 80 nm are stacked on one another.

A first gate electrode GE1, a second gate electrode GE2, a third gate electrode GE3, a fourth gate electrode GE4, a fifth gate electrode GE5, a sixth gate electrode GE6, a seventh gate electrode GE7, an eighth gate electrode GE8, a ninth gate electrode GE9, a tenth gate electrode GE10, an eleventh gate electrode GE11, a twelfth gate electrode GE12, a thirteenth gate electrode GE13, and a fourteenth gate electrode GE14 may be disposed on the first gate insulator GTI1.

The first gate electrode GE1 and the third gate electrode GE3 may be formed as a single body. The first gate electrode GE1 may overlap the first active layer ACT1, and the third gate electrode GE3 may overlap the third active layer ACT3.

The second gate electrode GE2, the fifth gate electrode GE5 and the fourteenth gate electrode GE14 may be formed as a single body. The second gate electrode GE2 may overlap the second active layer ACT2, the fifth gate electrode GE5 may overlap the third active layer ACT3, and the fourteenth gate electrode GE14 may overlap the third active layer ACT3.

The sixth gate electrode GE6 and the seventh gate electrode GE7 may be formed as a single body. The sixth gate electrode GE6 may overlap the fifth active layer ACT5, and the seventh gate electrode GE7 may overlap the fifth active layer ACT5.

The eighth gate electrode GE8 may overlap the sixth active layer ACT6.

The ninth gate electrode GE9 may overlap the seventh active layer ACT7.

The tenth gate electrode GE10 may overlap the seventh active layer ACT7.

The eleventh gate electrode GE11 may overlap the eighth active layer ACT8.

The twelfth gate electrode GE12 may overlap the eighth active layer ACT8.

The thirteenth gate electrode GE13 may overlap the ninth active layer ACT9.

The first gate electrode GE1, the second gate electrode GE2, the third gate electrode GE3, the fourth gate electrode GE4, the fifth gate electrode GE5, the sixth gate electrode GE6, the seventh gate electrode GE7, the eighth gate electrode GE8, the ninth gate electrode GE9, the tenth gate electrode GE10, the eleventh gate electrode GE11, the twelfth gate electrode GE12, the thirteenth gate electrode GE13 and the fourteenth gate electrode GE14 may include at least one of molybdenum (Mo), copper (Cu), aluminum and titanium (Ti) and may be made up of a single layer or multiple layers. For example, the first gate electrode GE1 may be implemented as triple films including a titanium film, an aluminum film and a titanium film sequentially arranged in the third direction DR3 on the first gate insulator GTI1.

The first transistor M1 may include a first gate electrode GE1, a first source electrode SE1, and a first drain electrode DE1.

The second transistor M2 may include a second gate electrode GE2, a second source electrode SE2, and a second drain electrode DE2.

The third transistor M3 may include a third gate electrode GE3, a third source electrode SE3, and a third drain electrode DE3.

The fourth transistor M4 may include a fourth gate electrode GE4, a fourth source electrode SE4, and a fourth drain electrode DE4.

The fifth transistor M5 may include a fifth gate electrode GE5, a fifth source electrode SE5, and a fifth drain electrode DE5.

The sixth transistor M6 may include a sixth gate electrode GE6, a sixth source electrode SE6, and a sixth drain electrode DE6.

The seventh transistor M7 may include a seventh gate electrode GE7, a seventh source electrode SE7, and a seventh drain electrode DE7.

The eighth transistor M8 may include an eighth gate electrode GE8, an eighth source electrode SE8, and an eighth drain electrode DE8.

The ninth transistor M9 may include a ninth gate electrode GE9, a ninth source electrode SE9, and a ninth drain electrode DE9.

The tenth transistor M10 may include a tenth gate electrode GE10, a tenth source electrode SE10, and a tenth drain electrode DE10.

The eleventh transistor M11 may include an eleventh gate electrode GE11, an eleventh source electrode SE11, and an eleventh drain electrode DE11.

The twelfth transistor M11 may include a twelfth gate electrode GE12, a twelfth source electrode SE12, and a twelfth drain electrode DE12.

The thirteenth transistor M13 may include a thirteenth gate electrode GE13, a thirteenth source electrode SE13, and a thirteenth drain electrode DE13.

The fourteenth transistor M14 may include a fourteenth gate electrode GE14, a fourteenth source electrode SE14, and a fourteenth drain electrode DE14.

A second gate insulator GTI2 may be disposed on the first gate electrode GE1, the second gate electrode GE2, the third gate electrode GE3, the fourth gate electrode GE4, the fifth gate electrode GE5, the sixth gate electrode GE6, the seventh gate electrode GE7, the eighth gate electrode GE8, the ninth gate electrode GE9, the tenth gate electrode GE10, the eleventh gate electrode GE11, the twelfth gate electrode GE12, the thirteenth gate electrode GE13, and the fourteenth gate electrode GE14. The second gate insulator GTI2 may be disposed on the front surface of the substrate SUB including the first gate electrode GE1, the second gate electrode GE2, the third gate electrode GE3, the fourth gate electrode GE4, the fifth gate electrode GE5, the sixth gate electrode GE6, the seventh gate electrode GE7, the eighth gate electrode GE8, the ninth gate electrode GE9, the tenth gate electrode GE10, the eleventh gate electrode GE11, the twelfth gate electrode GE12, the thirteenth gate electrode GE13 and the fourteenth gate electrode GE14. The second gate insulator GTI2 may include the same material and structure as the first gate insulator GTI1 described above.

The first capacitor electrode CE1 and the first output electrode OE1 may be disposed on the second gate insulator GTI2. The first capacitor electrode CE1 and the first output electrode OE1 may be formed as a single body. The first capacitor electrode CE1 may be connected to the ninth drain electrode DE9 of the ninth transistor M9 and the tenth source electrode SE10 of the tenth transistor M10 through a contact hole CT penetrating the second gate insulator GTI2 and the first gate insulator GTI1. For example, the first capacitor electrode CE1 and the first output electrode OE1 may be connected to a contact point between the ninth drain electrode DE9 and the tenth source electrode SE10 through the contact hole CT. The first capacitor electrode CE1 and the first output electrode OE1 may be made of the same material as the gate electrode described above.

An interlayer dielectric layer ITL may be disposed on the first capacitor electrode CE1 and the first output electrode OE1. In this instance, the interlayer dielectric layer ITL may be disposed entirely on the substrate SUB including the first capacitor electrode CE1 and the first output electrode OE1. The interlayer dielectric layer ITL may include an inorganic film, for example, a silicon nitride layer, a silicon oxynitride layer, a silicon oxide layer, a titanium oxide layer, or an aluminum oxide layer. The interlayer dielectric layer ITL may include a number of inorganic films.

A third gate insulator GTI3 may be disposed on the interlayer dielectric layer ITL. The third gate insulator GTI3 may be disposed on the entire surface of the substrate SUB including the interlayer dielectric layer ITL. The third gate insulator GTI3 may have the same material and structure as the first gate insulator GTI1 described above.

The second supply voltage line VDDL and the second capacitor electrode CE2 may be disposed on the third gate insulator GTI3. The second supply voltage line VDDL and the second capacitor electrode CE2 may be formed as a single body. The second capacitor electrode CE2 may overlap the first capacitor electrode CE1. The first compensation capacitor Ccp1 may be formed where the second capacitor electrode CE2 and the first capacitor electrode CE1 overlap each other. In plan view, the area of the first capacitor electrode CE1 may be substantially equal to the area of the second capacitor electrode CE2. The second supply voltage line VDDL and the second capacitor electrode CE2 may include the same material as the above-described first capacitor electrode CE1 and the first output electrode OE1.

Figure 10:
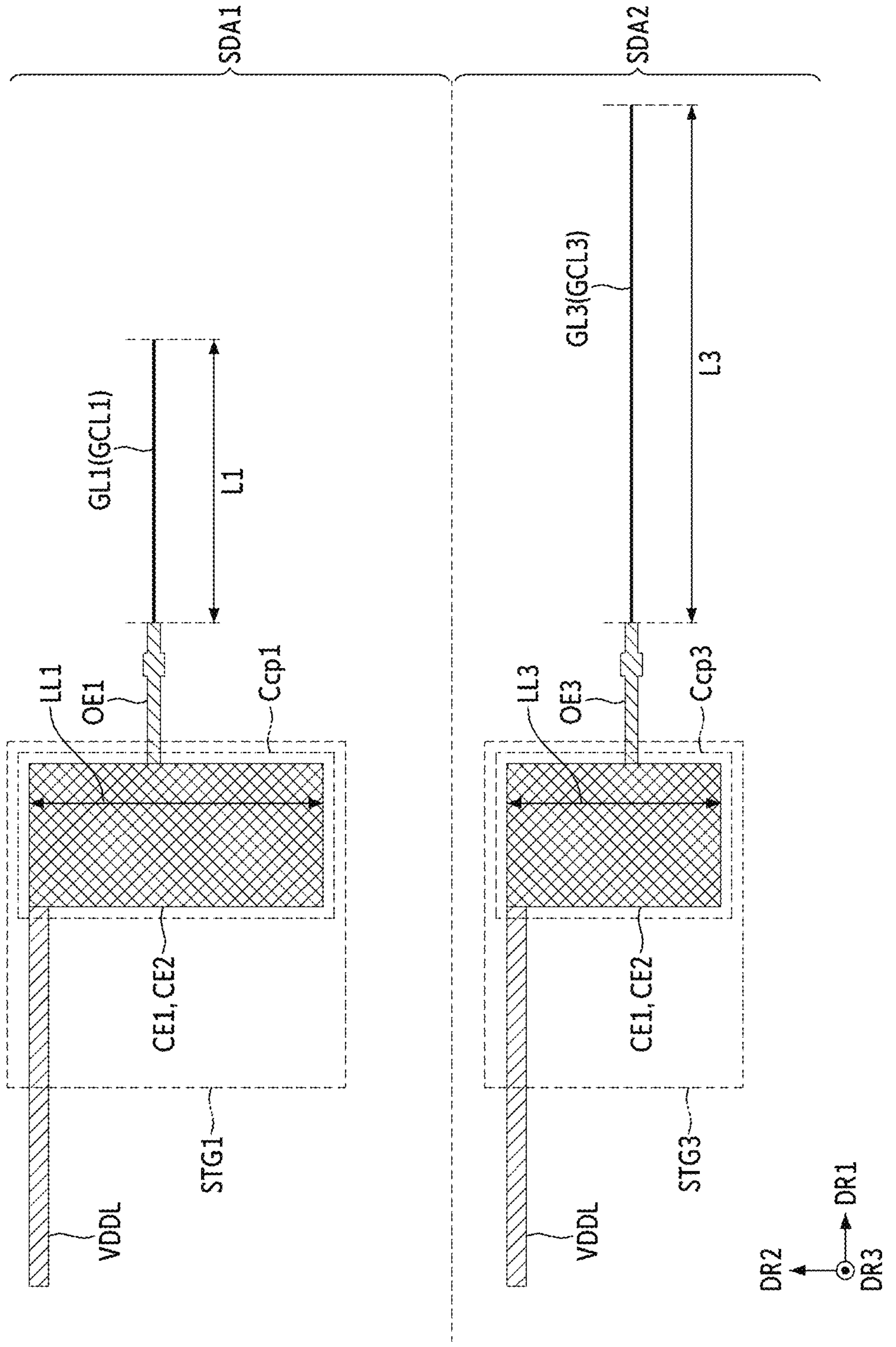
FIG. 10 is a schematic diagram for illustrating the capacitances of compensation capacitors in the first subsidiary display area and the second subsidiary display area.

FIG. 10 is a schematic diagram for illustrating the capacitances of compensation capacitors in the first subsidiary display area SDA1 and the second subsidiary display area SDA2.

As shown in FIG. 10, the first stage STG1 connected to the first gate line GL1 of the first subsidiary display area SDA1 may be connected to the first compensation capacitor Ccp1 of relatively large capacitance. For example, the first compensation capacitor Ccp1 connected to the first output electrode OE1 of the first stage STG1 for driving the first gate line GL1 of a short length L1 may have a large capacitance. For example, each of the first capacitor electrode CE1 and the second capacitor electrode CE2 of the first compensation capacitor Ccp1 may have a long length LL1.

On the other hand, as shown in FIG. 10, the third stage STG3 connected to the third gate line GL3 of the second subsidiary display area SDA2 may be connected to the third compensation capacitor Ccp3 of relatively small capacitance. For example, the third compensation capacitor Ccp3 connected to the third output electrode OE3 of the third stage STG3 for driving the third gate line GL3 of a long length L3 may have a small capacitance. For example, each of the first capacitor electrode CE1 and the second capacitor electrode CE2 of the third compensation capacitor Ccp3 may have a short length LL3. For example, the length LL3 of the first capacitor electrode CE1 (or the second capacitor electrode CE2) connected to the third stage STG3 may be smaller than the length LL1 of the first capacitor electrode CE1 (or the second capacitor electrode CE2) connected to the first stage STG1.

It should be noted that in FIG. 10, the width of the first capacitor electrode CE1 (or the second capacitor electrode CE2) connected to the first stage STG1 may be equal to the width of the first capacitor electrode CE1 (or the second capacitor electrode CE2) connected to the third stage STG3. For example, the width refers to the size of the first capacitor electrode CE1 in the first direction DR1.

Figure 11:
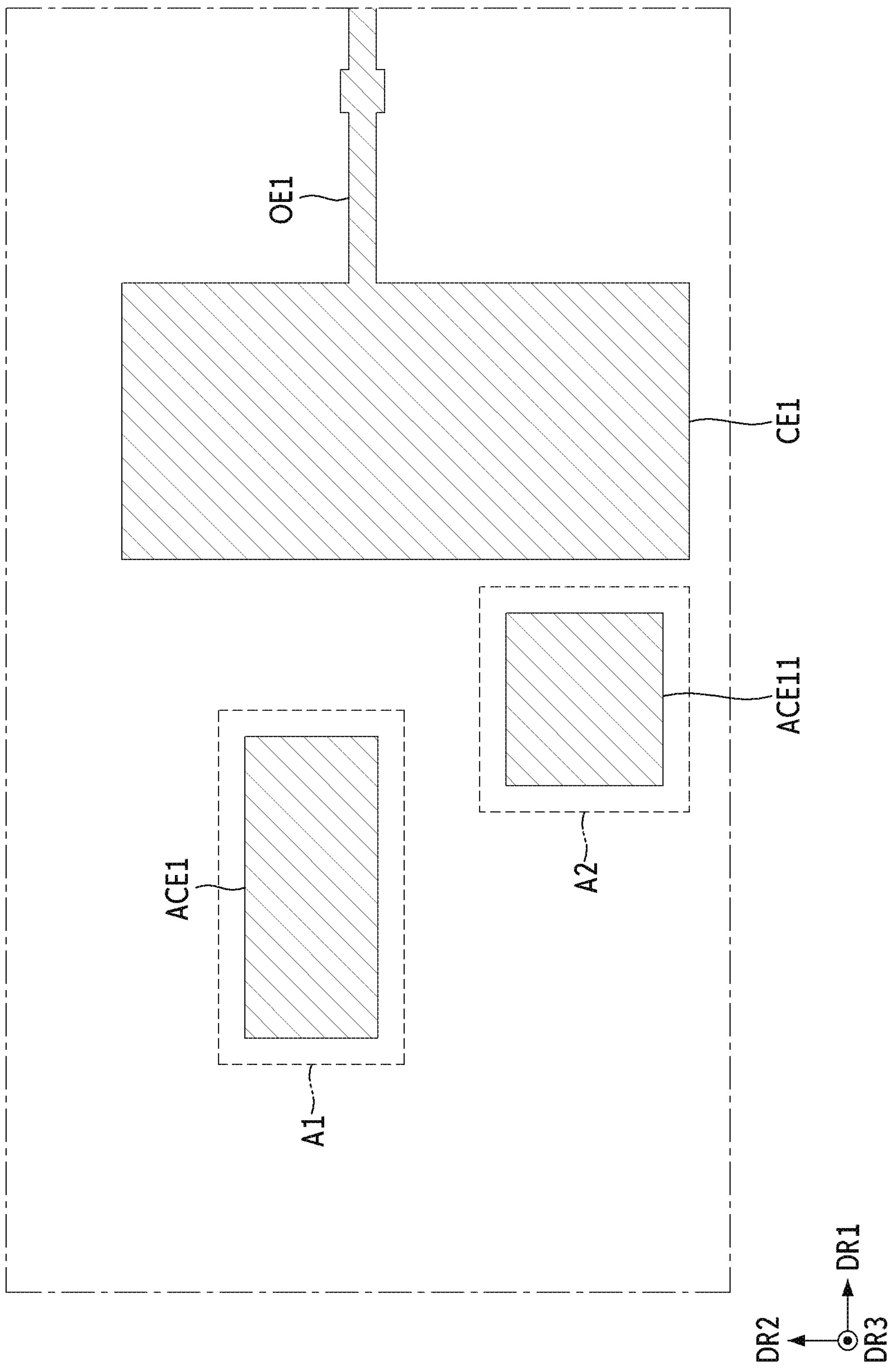
FIG. 11 is a schematic diagram for illustrating a first auxiliary capacitor electrode according to an embodiment.

FIG. 11 is a schematic diagram for illustrating a first auxiliary capacitor electrode ACE1 according to an embodiment.

As shown in FIG. 11, the first capacitor electrode CE1 (hereinafter referred to as a first auxiliary capacitor electrode ACE1) may be further disposed at a location of the non-display area NDA that is adjacent to the first capacitor electrode CE1. For example, as the first auxiliary capacitor electrodes ACE1 and ACE11 are further disposed in the first auxiliary area A1 and the second auxiliary area A2, respectively, the first auxiliary capacitor electrode ACE1 of the first auxiliary area A1 and the first auxiliary capacitor electrode ACE11 of the second auxiliary area A2 may be made of the same material as the first capacitor electrode CE1 and may be disposed on the same layer. For example, the first auxiliary capacitor electrode ACE1 of the first auxiliary area A1 and the first auxiliary capacitor electrode ACE11 of the second auxiliary area A2 may be integral with the first capacitor electrode CE1. In this instance, the area of at least one of the first auxiliary capacitor electrode ACE1 of the first auxiliary area A1 and the first auxiliary capacitor electrode ACE11 of the second auxiliary area A2 may have different sizes for different subsidiary display areas.

Figure 12:
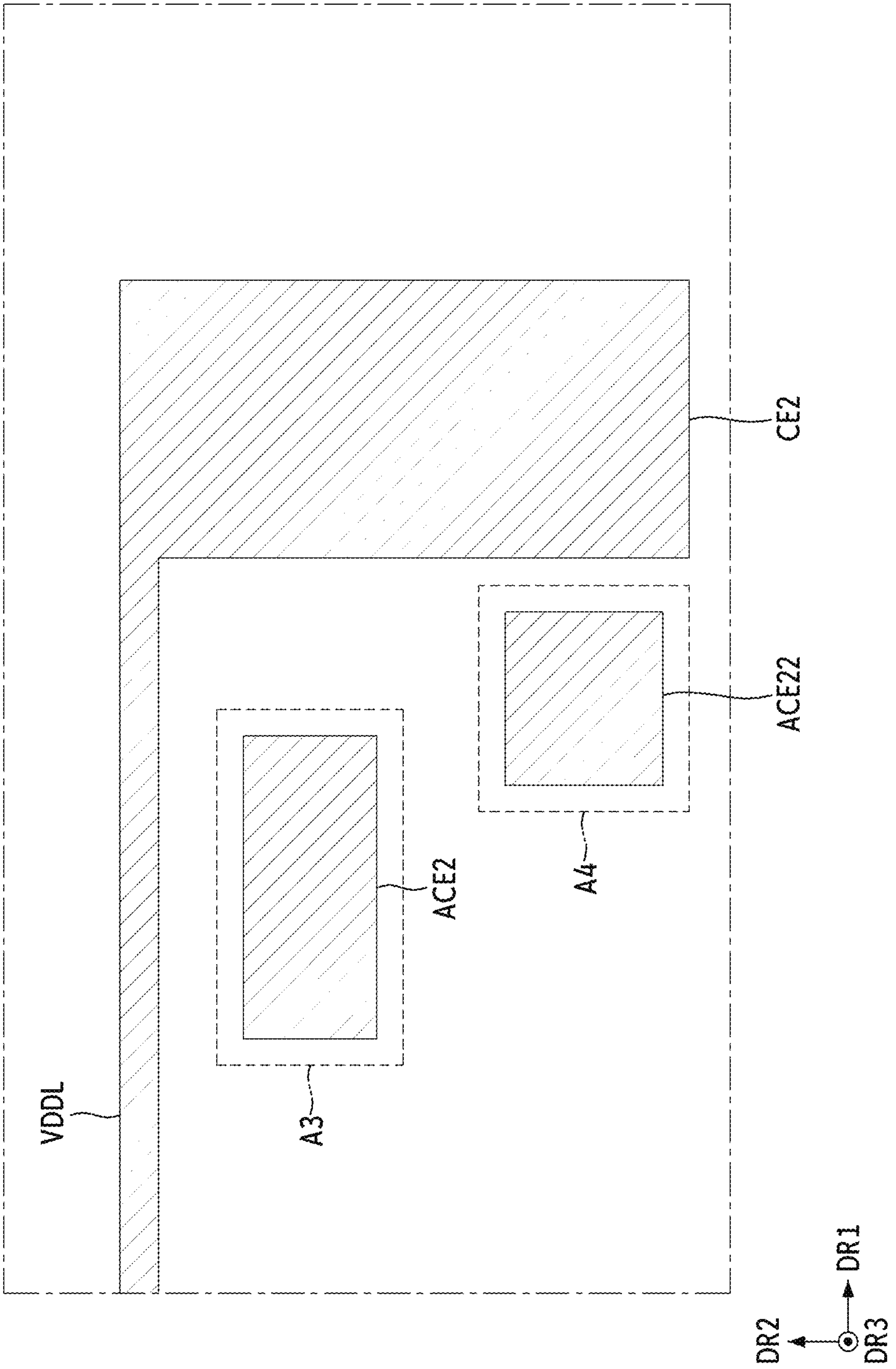
FIG. 12 is a schematic diagram for illustrating a second auxiliary capacitor electrode according to an embodiment.

FIG. 12 is a schematic diagram for illustrating a second auxiliary capacitor electrode ACE2 according to an embodiment.

As shown in FIG. 12, the second capacitor electrode CE2 (hereinafter referred to as a second auxiliary capacitor electrode) may be further disposed at a location of the non-display area that is adjacent to the second capacitor electrode CE2. For example, the second auxiliary capacitor electrodes ACE2 and ACE22 may be further disposed in the third auxiliary area A3 and the fourth auxiliary area A4, respectively, and the second auxiliary capacitor electrode ACE2 of the third auxiliary area A3 and the second auxiliary capacitor electrode ACE22 of the fourth auxiliary area A4 may be made of the same material as the second capacitor electrode CE2 and may be disposed on the same layer. In this instance, the second auxiliary capacitor electrode ACE2 of the third auxiliary area A3 and the second auxiliary capacitor electrode ACE22 of the fourth auxiliary area A4 may be integral with at least one of the second capacitor electrode CE2 and the second supply voltage line VDDL. In this instance, the area of at least one of the second auxiliary capacitor electrode ACE2 of the third auxiliary area A3 and the second auxiliary capacitor electrode ACE2 of the fourth auxiliary area A4 may have different sizes for different subsidiary display areas.

For example, the second auxiliary capacitor electrode ACE2 of the third auxiliary area A3 may overlap the first auxiliary capacitor electrode ACE1 in the first auxiliary area A1, and the second auxiliary capacitor electrode ACE22 of the fourth auxiliary area A4 may overlap the first auxiliary capacitor electrode ACE11 of the second auxiliary area A2.

Figure 13:
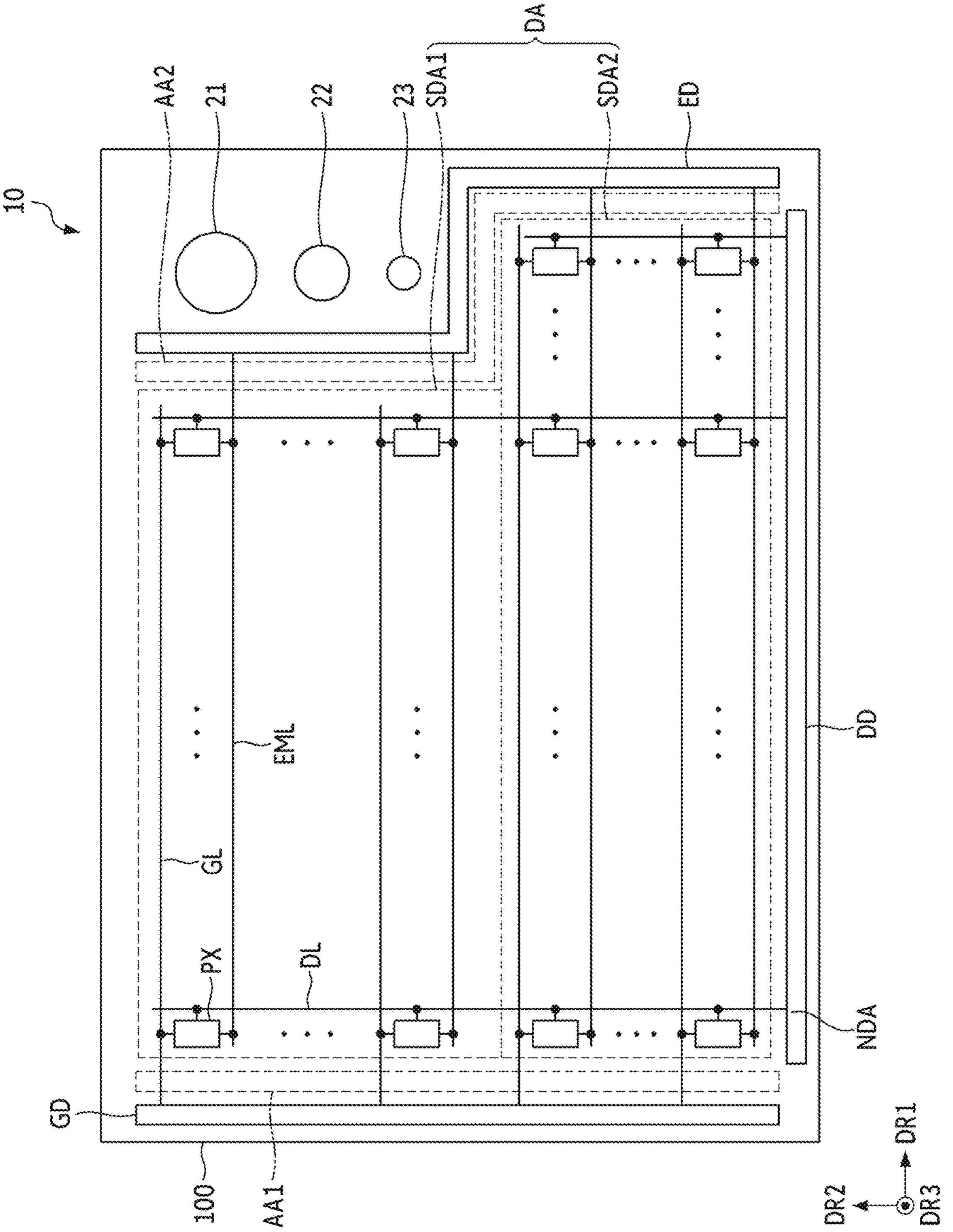
FIG. 13 is a schematic plan view of a display device according to an embodiment.

FIG. 13 is a schematic plan view of a display device according to an embodiment.

The display device of FIG. 13 is substantially identical to the display device of FIG. 1 described above except that the former further includes a first subsidiary non-display area AA1 and a second subsidiary non-display area AA2; and, therefore, the redundant descriptions will be omitted for descriptive convenience.

A part of the non-display area NDA between the gate driver GD and the display area DA may be defined as a first subsidiary non-display area AA1, and a part of the non-display area NDA between the emission driver ED and the display area DA may be defined as the second subsidiary non-display area AA2. The capacitor electrode of the compensation capacitor may be disposed in at least one of the first subsidiary non-display area AA1 and the second subsidiary non-display area AA2.

Figure 14:
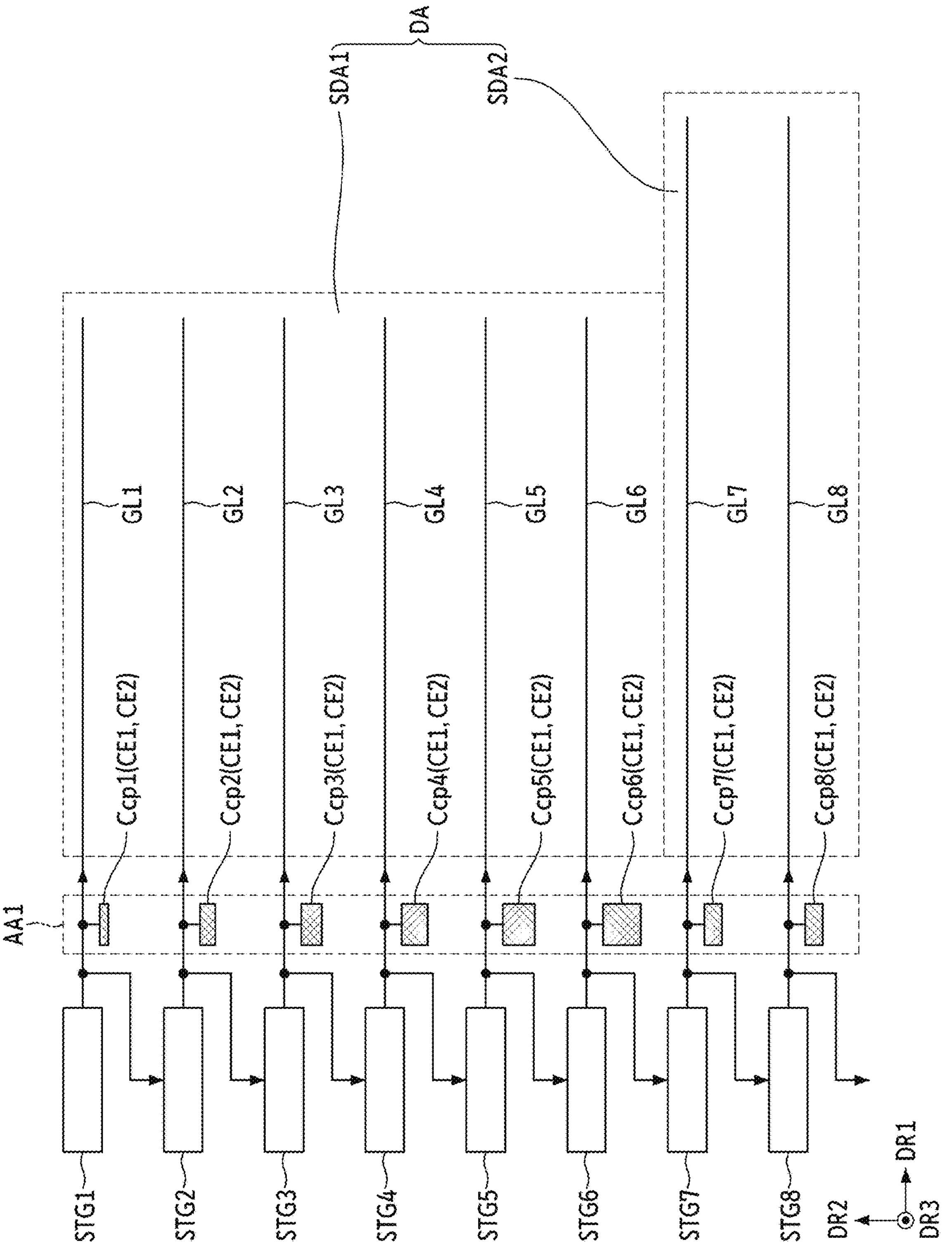
FIG. 14 is a schematic diagram for illustrating the relative sizes of capacitor electrodes according to an embodiment.

FIG. 14 is a schematic diagram for illustrating the relative sizes of capacitor electrodes according to an embodiment.

As in the example shown in FIG. 14, the first and second capacitor electrodes CE1 and CE2 that overlap each other may be disposed in the first subsidiary non-display area AA1.

The first to sixth gate lines GL1 to GL6 may be disposed in the first subsidiary display area SDA1, and the seventh and eighth gate lines GL7 and GL8 having a length larger than the gate lines of the first subsidiary display area SDA1 may be disposed in the second subsidiary display area SDA2.

The first to sixth gate lines GL1 to GL6 of the first subsidiary display area SDA1 may be connected to the first to sixth stages STG1 to STG6, respectively, and the seventh and eighth gate lines GL7 and GL8 of the second subsidiary display area SDA2 may be connected to the seventh and eighth stages STG7 and STG8, respectively.

The first to sixth gate lines GL1 to GL6 of the first subsidiary display area SDA1 and the first to sixth stages STG1 to STG6 may be connected to the first to sixth compensation capacitors Ccp1 to Ccp6, respectively, and the seventh and eighth gate lines GL7 and GL8 of the second subsidiary display area SDA2 and the seventh and eighth stages STG7 and STG8 may be connected to the seventh and eighth compensation capacitors Ccp7 and Ccp8, respectively.

The compensation capacitors Ccp1 to Ccp6 connected to the stages for driving the gate lines GL1 to GL6 of the first subsidiary display area SDA1 may have a smaller capacitance as they are located farther away from the second subsidiary display area SDA2. For example, the stages STG1 to STG6 connected to the gate lines GL1 to GL6 of the first subsidiary display area SDA1 may be connected to compensation capacitors with a smaller capacitance as they are located farther away from the second subsidiary display area SDA2. For example, among the first to sixth compensation capacitors Ccp1 to Ccp6, the area of the capacitor electrodes (e.g., the first capacitor electrode CE1 and the second capacitor electrode CE2) of the sixth compensation capacitor Ccp6 may be the largest, the area of the capacitor electrodes (e.g., the first capacitor electrode CE1 and the second capacitor electrode CE2) of the fifth compensation capacitor Ccp5 may be smaller than the area of the capacitor electrodes (e.g., the first capacitor electrode CE1 and the second capacitor electrode CE2) of the sixth compensation capacitor Ccp6, the area of the capacitor electrodes (e.g., the first capacitor electrode CE1 and the second capacitor electrode CE2) of the fourth compensation capacitor Ccp4 may be smaller than the area of the capacitor electrodes (e.g., the first capacitor electrode CE1 and the second capacitor electrode CE2) of the fifth compensation capacitor Ccp5, the area of the capacitor electrodes (e.g., the first capacitor electrode CE1 and the second capacitor electrode CE2) of the third compensation capacitor Ccp3 may be smaller than the area of the capacitor electrodes (e.g., the first capacitor electrode CE1 and the second capacitor electrode CE2) of the fourth compensation capacitor Ccp4, the area of the capacitor electrodes (e.g., the first capacitor electrode CE1 and the second capacitor electrode CE2) of the second compensation capacitor Ccp2 may be smaller than the area of the capacitor electrodes (e.g., the first capacitor electrode CE1 and the second capacitor electrode CE2) of the third compensation capacitor Ccp3, and the area of the capacitor electrodes (e.g., the first capacitor electrode CE1 and the second capacitor electrode CE2) of the first compensation capacitor Ccp1 may be smaller than the area of the capacitor electrodes (e.g., the first capacitor electrode CE1 and the second capacitor electrode CE2) of the second compensation capacitor Ccp2. For example, along the second direction DR2, the length of the capacitor electrodes (e.g., the first capacitor electrode CE1 and the second capacitor electrode CE2) associated with the first subsidiary display area SDA1 (e.g., the size of the capacitor electrodes in the second direction DR2) may decrease gradually. As a result, the capacitance of the compensation capacitors associated with the first subsidiary display area SDA1 may decrease gradually in the second direction DR2.

For example, among the gate lines GL1 to GL6 of the first subsidiary display area SDA1, the gate line closest to the second subsidiary display area SDA2 (e.g., the sixth gate line GL6) may be defined as a first closest gate line, and the stage (e.g., the sixth stage STG6) connected to the first closest gate line may be defined as a first closest stage. Among the gate lines GL7 and GL8 of the second subsidiary display area SDA2, the gate line closest to the first subsidiary display area SDA1 (e.g., the seventh gate line GL7) may be defined as a second closest gate line, and the stage (e.g., the seventh stage STG7) connected to the second closest gate line may be defined as a second closest stage. The compensation capacitor (e.g., the sixth compensation capacitor Ccp6) connected to the first closest stage may have a larger capacitance than the compensation capacitor (e.g., the seventh compensation capacitor Ccp7) connected to the second closest stage so that the load of the second closest stage may be substantially equal to the load of the first closest stage.

For example, the sixth compensation capacitor Ccp6 connected to the sixth stage STG6 may have a larger capacitance than the seventh compensation capacitor connected to the seventh stage STG7 so that the load of the seventh stage STG7 may be substantially equal to the load of the sixth stage STG6 for driving the seventh gate line GL7 and the sixth gate line GL6 connected to different numbers of pixels. For example, the sixth compensation capacitor Ccp6 connected to the sixth stage STG6 may have a larger capacitance than the seventh compensation capacitor connected to the seventh stage STG7 so that the load of the seventh stage STG7 may be substantially equal to the load of the sixth stage STG6 which are connected to the seventh gate line GL7 and the sixth gate line GL6, respectively, of different lengths.

Let us suppose the load of the second closest stage (e.g., the stage STG) is 100% as the reference. Then, the load of the first closest stage may be 100%, which is substantially equal to the reference. Among the gate lines GL1 to GL6 in the first subsidiary display area SDA1, the stage (hereinafter referred to as the outermost stage; e.g., the first stage STG1) connected to the gate line (hereinafter referred to as the outermost gate line; e.g., the first gate line GL1) disposed furthest from the second subsidiary display area SDA2 may have a load of about 92%. The stages between the first closest stage and the outermost stages may have a load that decreases gradually between about 100% and about 92% in the second direction DR2.

In order to make the loads of all of the stages equal, it is desired that the area of the capacitor electrodes of the first subsidiary display area SDA1 is the largest (e.g., the size of the capacitor electrodes provided in the sixth compensation capacitor Ccp6). In case that the non-display area is not sufficient to maximize the area of the capacitors of the compensation capacitors connected to all of the stages, only the load of the first closest stage and the load of the second closest stage may be equal to each other, while the area of the capacitor electrodes connected to the stages for driving the gate lines of the first subsidiary display area SDA1 may decrease gradually, as in the example shown in FIG. 14 described above. In this manner, load differences between the stages disposed at the boundary between the first subsidiary display area SDA1 and the second subsidiary display area SDA2 may be reduced. For example, since the loads of the stages from the boundary to the stages connected to the outermost gate line (e.g., the first gate line GL1) decrease gradually, the load differences between adjacent stages in the first subsidiary display area SDA1 may be reduced. Therefore, according to the embodiment of FIG. 14, it is possible to suppress deterioration of the display quality due to load differences between the stages (e.g., Mura on the screen) even without setting the areas of the compensation capacitors connected to the stages for driving the first subsidiary display area SDA1 to the maximum.

Figure 15:
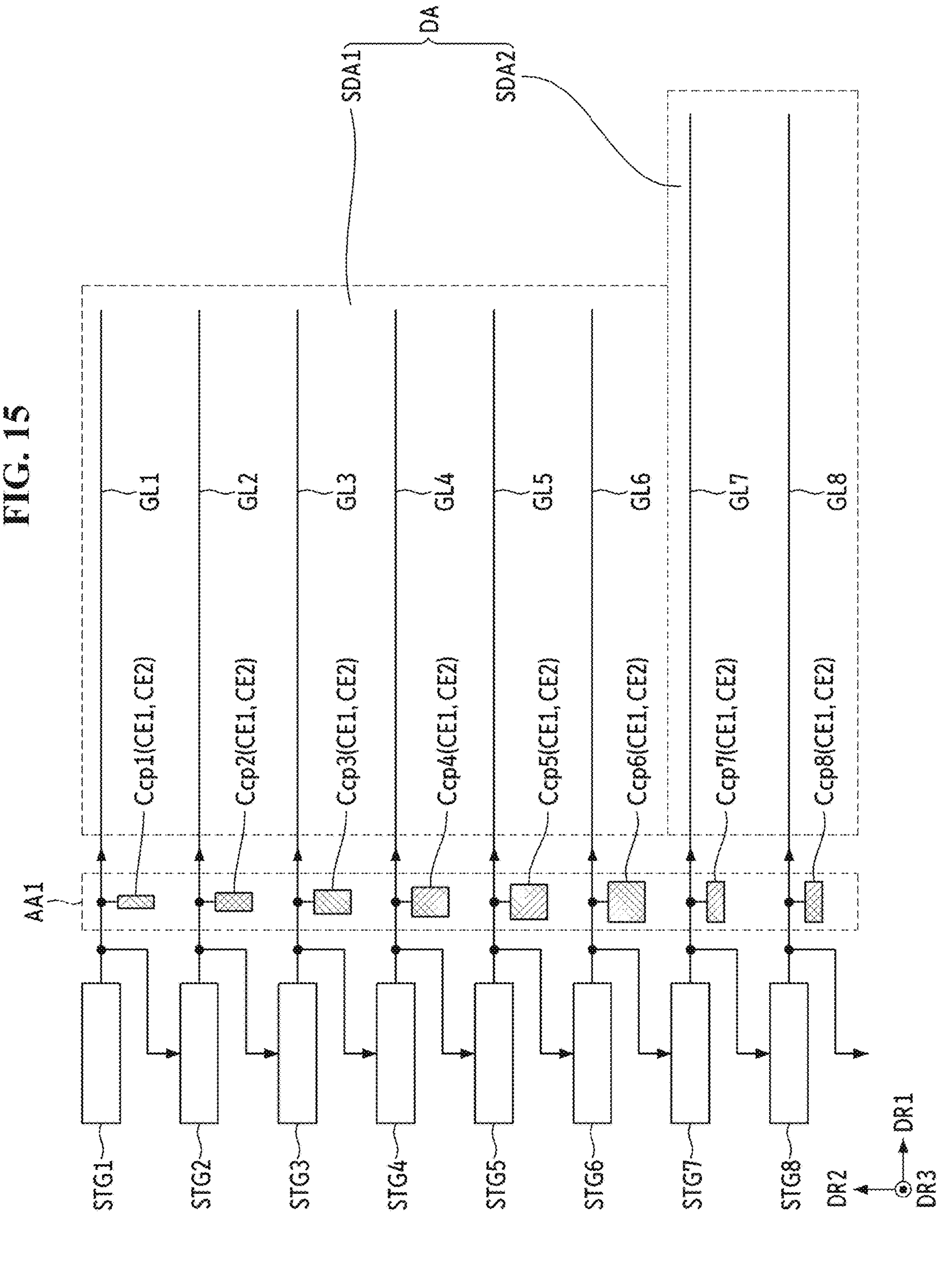
FIG. 15 is a schematic diagram for illustrating the relative sizes of capacitor electrodes according to an embodiment.

FIG. 15 is a schematic diagram for illustrating the relative sizes of capacitor electrodes according to an embodiment.

A display device of FIG. 15 is different from the display device of FIG. 14 described above in that the width of the capacitor electrodes gradually decreases. The following description will focus on the difference.

As shown in FIG. 15, along the second direction DR2, the width of the capacitor electrodes (e.g., the first capacitor electrode CE1 and the second capacitor electrode CE2) (e.g., the size of the capacitor electrodes in the first direction DR1) may gradually decrease.

Figure 16:
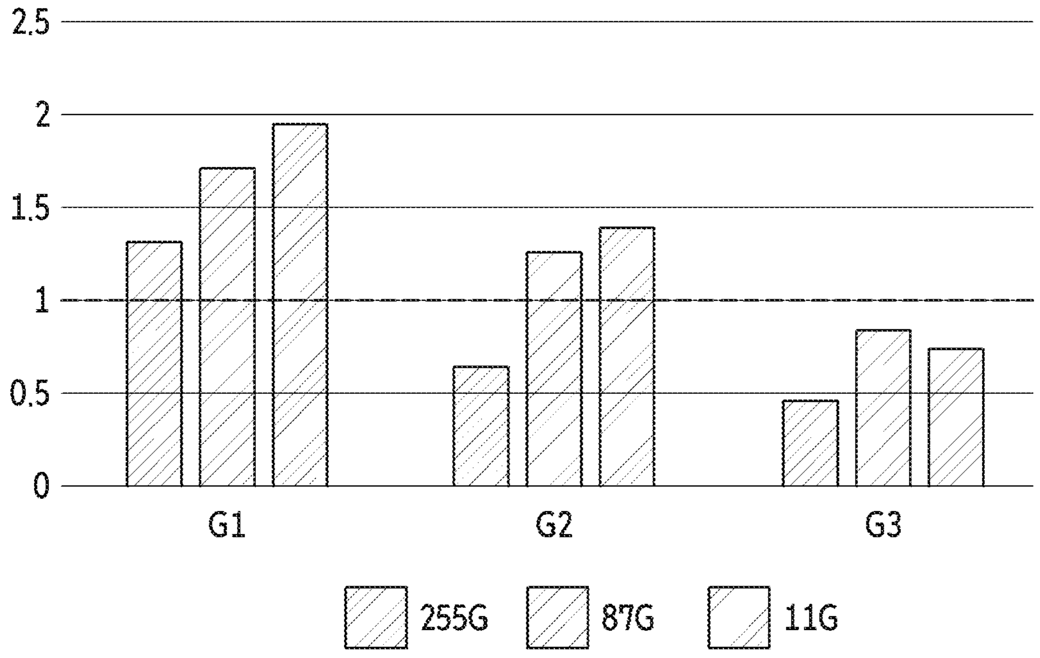
FIG. 16 is a schematic view for illustrating the effects achieved by a display device according to an embodiment.

FIG. 16 is a schematic view for illustrating the effects achieved by a display device according to an embodiment.

FIG. 16 is a graph showing bars G1 representing the degree of occurrence of Mura for different grayscale ranges in a display device according to Example 1 (hereinafter referred to as a first display device), bars G2 representing the degree of occurrence of Mura for different grayscale ranges in a display device according to Example 2 (hereinafter referred to as a second display device), and bars G3 representing the degree of occurrence of Mura for different grayscale ranges in a display device according to Example 3 (hereinafter referred to as a third display device).

In the first display device, no compensation capacitor is applied. As represented by the bars G1, the first display device has a just-noticeable difference (JND) value exceeding 1 at all of a high gray scale level (e.g., a 255 gray-scale value), a median gray scale level (e.g., an 87 gray-scale value), and a low gray scale level (e.g., a 11 gray-scale value). For example, it may be seen that Mura occurs at all of the high gray scale level, the median gray scale level and the low gray scale level in the first display device.

In the second display device, the compensation capacitors of FIG. 14 are applied to the stages of the write gate signal output of the gate driver GD. As represented by the bars G2, the second display device has a JND value exceeding 1 at the median gray scale level (e.g., the 87 gray-scale value), and the low gray scale level (e.g., the 11 gray-scale value). For example, it may be seen that Mura occurs at the median gray scale level and the low gray scale level in the second display device.

In the third display device, the compensation capacitors of FIG. 14 are applied to the stages of the control gate signal output of the gate driver GD. As represented by the bars G3, the third display device has a JND value less than 1 at the high gray scale level (e.g., the 255 gray-scale value), the median gray scale level (e.g., the 87 gray-scale value), and the low gray scale level (e.g., the 11 gray-scale value). For example, it may be seen that Mura occurs at none of the high gray scale level, the median gray scale level and the low gray scale level in the third display device.

It may be seen from the above that the display quality may be significantly improved by applying the compensation capacitors to the stages in the control gate signal output for controlling the third transistor T3 of FIG. 2.

In concluding the detailed description, those skilled in the art will appreciate that many variations and modifications may be made to the embodiments without substantially departing from the principles of the invention. Therefore, the disclosed embodiments of the invention are used in a generic and descriptive sense only and not for purposes of limitation.

What is claimed is:

1. A display device comprising:

a display panel;

a first gate line and a second gate line disposed on the display panel;

a gate driver connected to the first gate line and the second gate line, wherein:

a number of pixels connected to the first gate line is less than a number of pixels connected to the second gate line; and the gate driver comprises:

a first stage comprising a first output unit connected to the first gate line through a first output electrode; and a second stage comprising a second output unit connected to the second gate line through a second output electrode;

a first compensation capacitor connected to the first output electrode and connected to the first output unit through a first contact hole in one or more gate insulation layers; and a second compensation capacitor connected to the second output electrode, connected to the second output unit through a second contact hole in the one or more gate insulation layers, wherein a capacitance of the first compensation capacitor is greater than a capacitance of the second compensation capacitor, and wherein the first compensation capacitor and the second compensation capacitor are disposed in a non-display area between the gate driver and a display area of the display panel.

2. The display device of claim 1, wherein a length of the first gate line is greater than a length of the second gate line.

3. The display device of claim 1, wherein the first compensation capacitor comprises:

a first capacitor electrode connected to the first output electrode; and a second capacitor electrode connected to a power line and overlapping the first capacitor electrode.

4. The display device of claim 3, wherein the power line transmits a direct-current (DC) voltage.

5. The display device of claim 3, wherein the second compensation capacitor comprises:

a first capacitor electrode connected to the second output electrode; and a second capacitor electrode connected to a power line and overlapping the first capacitor electrode of the second compensation capacitor.

6. The display device of claim 5, wherein the first capacitor electrode of the first compensation capacitor has a larger size than the first capacitor electrode of the second compensation capacitor.

7. The display device of claim 5, wherein the second capacitor electrode of the first compensation capacitor has a larger size than the second capacitor electrode of the second compensation capacitor.

8. The display device of claim 1, wherein a capacitance of the first compensation capacitor is greater than a capacitance of the second compensation capacitor so that a load of the first stage connected to the first gate line is substantially equal to a load of the second stage connected to the second gate line.

9. The display device of claim 1, further comprising:

a third gate line adjacent to the first gate line, wherein:

the gate driver further comprises a third stage connected to the third gate line through a third output electrode; and a number of pixels connected to the third gate line is equal to a number of pixels connected to the first gate line.

10. The display device of claim 9, wherein a length of the third gate line is substantially equal to a length of the first gate line.

11. The display device of claim 9, further comprising:

a third compensation capacitor connected to the third output electrode.

12. The display device of claim 11, wherein the first gate line is disposed between the second gate line and the third gate line.

13. The display device of claim 12, wherein a capacitance of the third compensation capacitor is substantially equal to the capacitance of the first compensation capacitor.

14. The display device of claim 12, wherein a capacitance of the third compensation capacitor is less than the capacitance of the first compensation capacitor.

15. The display device of claim 1, wherein the display panel comprises:

the display area where the first gate line and the second gate line are disposed; and the non-display area where the gate driver is disposed.

16. The display device of claim 15, wherein the display area comprises a first subsidiary display area and a second subsidiary display area having different sizes.

17. The display device of claim 16, wherein:

a length of the first gate line is greater than a length of the second gate line; and a length of the first subsidiary display area is greater than a length of the second subsidiary display area.

18. The display device of claim 17, wherein:

the first gate line is disposed in the first subsidiary display area; and the second gate line is disposed in the second subsidiary display area.

* * * * *